United States Patent [19]
Elliott

[11] Patent Number: 5,327,165
[45] Date of Patent: Jul. 5, 1994

[54] ELECTRONIC PRINTING SYSTEM FOR IMAGING THERMALLY SENSITIVE PAPER

[75] Inventor: J. W. Elliott, College Station, Tex.

[73] Assignee: Schlumberger Technology Corporation, Houston, Tex.

[21] Appl. No.: 330,454

[22] Filed: Mar. 30, 1989

[51] Int. Cl.⁵ .............................................. G01D 15/10
[52] U.S. Cl. ................................. 346/76 PH; 358/298; 407/120
[58] Field of Search ............ 346/76 PH; 400/120 PH; 358/298

[56] References Cited

U.S. PATENT DOCUMENTS

| | | | |
|---|---|---|---|
| 4,462,704 | 7/1984 | Kurata et al. | 346/76 PH |
| 4,492,482 | 1/1985 | Eguchi et al. | 346/76 PH |
| 4,560,993 | 12/1985 | Hakoyama | 346/76 PH |
| 4,574,293 | 3/1986 | Inui et al. | 346/76 PH |
| 4,591,876 | 5/1986 | Nozaki et al. | 346/76 PH |
| 4,737,860 | 4/1988 | Ono et al. | 358/298 |
| 4,801,948 | 1/1989 | Kato | 358/298 |
| 4,806,949 | 2/1989 | Onuma et al. | 358/298 |

FOREIGN PATENT DOCUMENTS

| | | | |
|---|---|---|---|
| 0130379 | 10/1981 | Japan | 400/120 |
| 0053045 | 3/1986 | Japan | 400/120 |

*Primary Examiner*—Benjamin R. Fuller
*Assistant Examiner*—Huan Tran

[57] ABSTRACT

An electronic printing system for imaging lines of pixels on thermally sensitive paper is disclosed. The pixels are imaged in accordance with digital data representing whether a particular pixel is to be imaged or not. The system may also operate in a gray scale mode where the optical density of the imaged pixels varies in accordance with digital data. Other features enable the system to image the lines at a high rate of speed and with a lessened power requirement, thus enabling the use of relatively insensitive thermal paper.

18 Claims, 11 Drawing Sheets

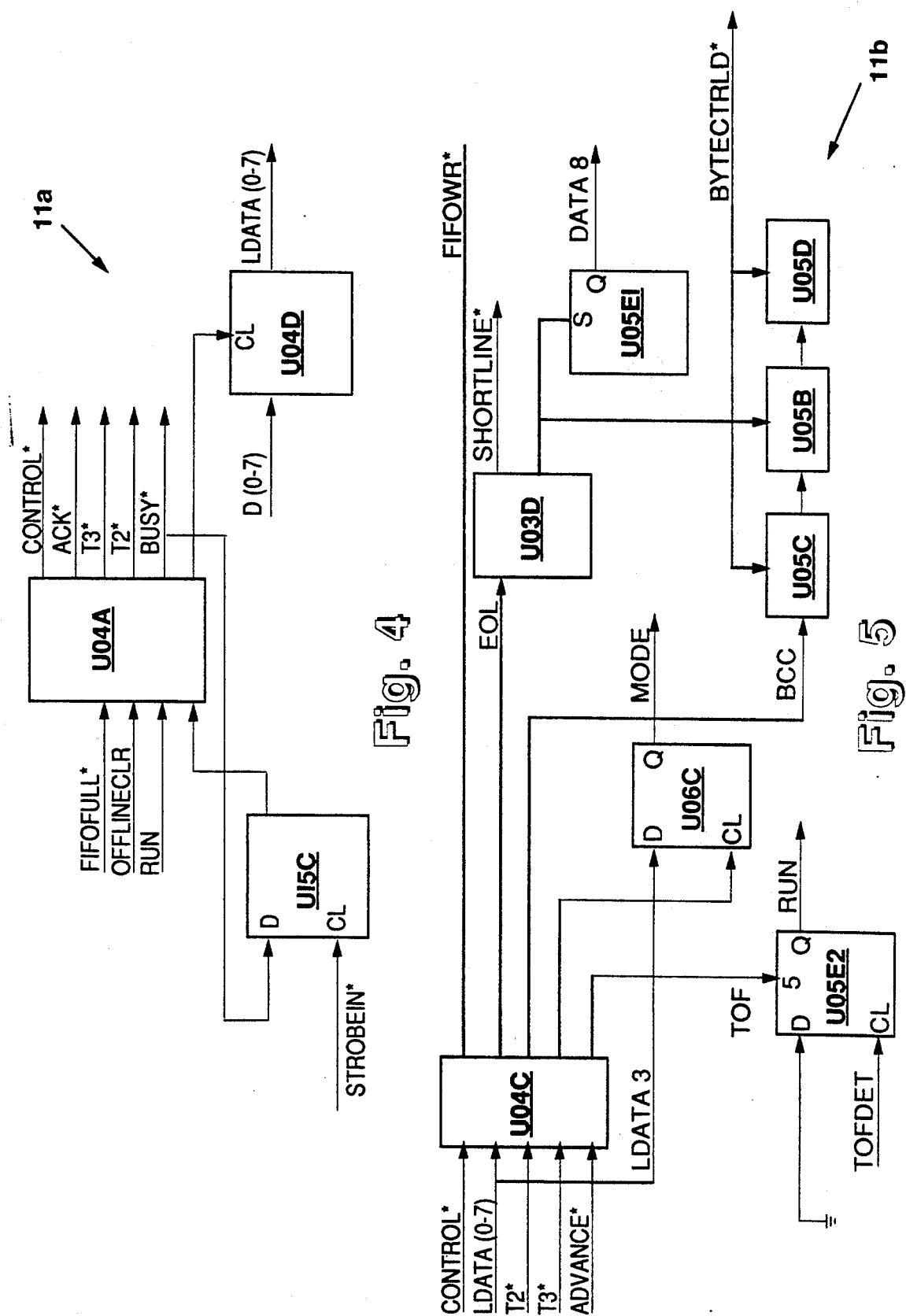

ELECTRONIC PRINTING SYSTEM FOR IMAGING THERMALLY SENSITIVE PAPER

BACKGROUND OF THE INVENTION

1. Field of the Invention

The present invention relates to a high speed thermal printing system, and specifically a system capable of printing graphic material (for example, well logs) at relatively high speeds under adverse environment conditions while maintaining constant image quality.

2. Background

Basic high-speed thermal printers comprise a fixed thermal printhead, a resilient drive roller which is driven by a stepping motor, an electronic control circuit, and a power supply. The thermal printhead usually has a linear array of resistance heater elements, typically 200 elements/inch, across the width of the printhead. The printhead also contains a shift register stage, a latch stage, and a current driver for each heater element. The printer operates by pressing thermally sensitive paper (thermal paper) against the thermal printhead through the use of a resilient drive roller. The data to be recorded are shifted serially into the shift registers transferred to the latches, and then finally recorded by activating the current drivers with a print signal, or strobe pulse. New data can be shifted into the shift registers while the previous line of data stored in the latches is being printed.

Typical control circuits for thermal printheads account for the fact that the thermal elements in the printhead which were activated on a previous image line have a residual temperature which placed those elements at a higher temperature in relation to those elements which were not used in printing the previous image line. The usual solution which has been employed for that problem is to use a full length strobe pulse for heater elements which were not active during the printing of the previous image line, and a shorter strobe pulse for those heater elements which are used to print both the present and the previous line. This solution, however, requires shifting data into the thermal printhead twice for each image line being printed. The technique also permits intentional variation of density for gray scale presentations. However, in that case data must be shifted into the thermal printhead once for each shade of gray. The result is that the printing speed is limited.

Additionally, present thermal printers, as described above, are not able to produce uniform image quality when printing speed and ambient temperature conditions vary. This is because once a printhead element is heated to a certain temperature, it does not cool immediately upon removal of the driving current. Variations in either the printing speed or ambient temperature will affect the rate at which the printhead element cools. These two variables will thus cause the image density to vary unless they are compensated for.

Most present thermal printers are also not able to handle the high current axed power levels required to print an "all black" image. The useful life of the printhead is shortened considerably if such "all black" imaging is done repetitively. Furthermore, the power needed for present thermal printers to generate "all black" images imposes an increased power supply requirement with attendant increases in size and cost. This same factor also limits the ambient temperature conditions under which present thermal printers can operate. In order to operate under conditions of high ambient temperature, thermal paper must be used which is relatively insensitive so that it can be stored without darkening due simply to high ambient temperature. Currently available thermal printers have problems with such insensitive thermal paper for the same reasons that they have problems generating "all black images," i.e., shorter printhead life and increased power supply costs.

In summary, currently available thermal printers are not able to print 16-level gray scale images at speeds on the order of 1-inch per second due to the time required to shift data into the thermal printhead 16 times per image line. Also, available thermal printers which attempt to print large-area "all black" images at high speed cause overheating of the thermal printhead, and require larger and more costly power supplies. For the same reason, these printers have problems when relatively insensitive thermal paper is used.

The present invention was developed to overcome the problems discussed above. It is an object of the present invention to provide an electronic thermal printing system capable of printing in either a gray scale or graphics mode at high speeds. A further object of the present invention is to minimize the power requirements for generating a given image, thus facilitating the use of relatively insensitive thermal paper. It is still a further object of the present invention to provide images of uniform quality in spite of variations in printing speed, ambient temperature, and line to line variation in the use of particular resistance elements.

SUMMARY OF THE INVENTION

The thermal printing system that is the present invention provides for the relatively high speed of 2-inches per second in a graphics mode for line-type images, such as traces, grids, texts and the like and in a gray scale mode permits relatively high speed, i.e. 1-inch per second, printing for variable density gray scale images. In the graphics mode, the system images lines of pixels in accordance with digital data wherein each bit signifies whether a particular pixel in the line is to be darkened or not. In the gray scale mode, each pixel is imaged in accordance with words (i.e. groups of bits) in the digital data representing the desired optical density of each pixel. Both modes print at a resolution of 200 pixels, or dots, per inch. In the gray scale mode, each pixel may be varied in density according to 16 shades of gray in the preferred embodiment.

One feature of the present invention permits the thermal print elements of the printhead to be operated at relatively constant power levels, instead of varying those power levels with ambient temperature. According to the present invention, a resistance heater strip is bonded to the printhead substrate or to a printhead mount which has good thermal coupling to the printhead substrate. The resistance heater strip permits the printhead to be heated to a temperature of 60°-70° C. This decreases the energy which must be supplied to the paper from the thermal elements of the printhead.

The present invention also utilizes a multiple-input thermal printhead. The printhead contains a plurality of resistor elements which, when heated by pulses of current, transfer heat to the thermal paper and thereby produce a darkened pixel. The data to be printed are stored in digital form (i.e., a one signifies a darkened pixel) in a shift register. The individual outputs of the shift register are gated to the resistor elements with strobe pulses, thereby generating current pulses to be driven across the resistor elements by the printhead supply voltage. According to the present invention, the shift register on the printhead is divided into four segments, each of which receives data for one-fourth of the thermal head print elements as well as a separate print strobe pulse. Data can therefore be shifted into the printhead four times faster than into a single-input printhead. This permits the multiple data shifts required for 16-level variable density gray scale recording at the relatively high speed of 1-inch per second.

The invention further includes a circuit which monitors the number of dots which are to be printed in each image line, and controls the four print strobe signals such that no more than 25% of the head elements are activated at any one time. That permits high-speed printing of line-type or graphic images, e.g. traces, grids, texts and so forth. When recording variable density gray scale images, those four strobe signals are pulsed with sequential 25% duty-cycle, high frequency signals. This pulsing automatically insures that no more than 25% of the thermal print elements are "on" at any one time. The high frequency strobe chopping also extends the time required to print one shade of gray to a length sufficient to allow the data for the next shade to be shifted into the head.

According to the present invention, the widths of the print strobe signals are automatically varied in response to printhead temperature and supply voltage. Control switches on the printer of the present invention permit the printer to be adjusted to accept thermal papers which have widely different sensitivities and gammas. The invention includes the use of a microprocessor and associated software which is used to correct for non-linear paper response or to create intentional non-linear gray scale presentations.

BRIEF DESCRIPTION OF THE DRAWINGS

FIG. 4 is a schematic of the input circuit of the parallel interface circuit.

FIG. 5 is a schematic of the byte counter/interpreter of the parallel interface circuit.

DETAILED DESCRIPTION OF THE PREFERRED EMBODIMENT

A. Theory of Operation

Figure 1:
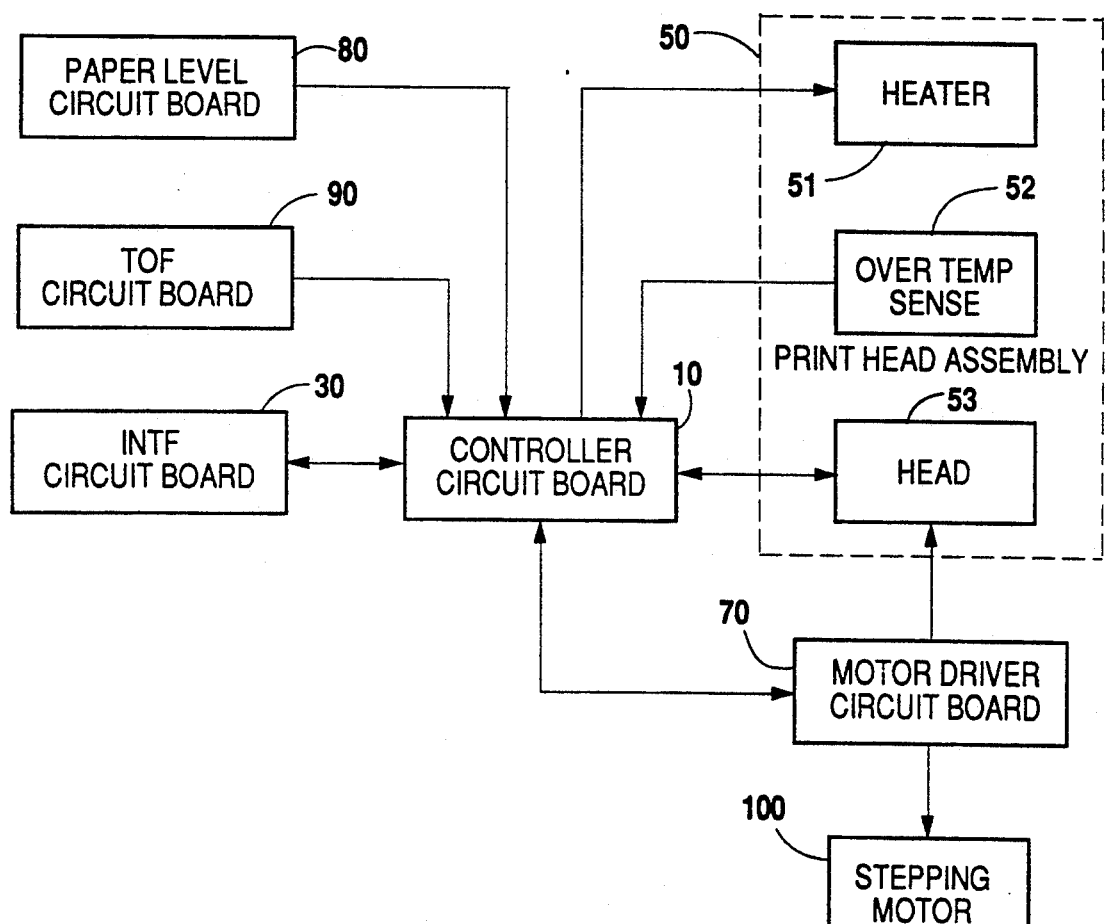
FIG. 1 is a block diagram of the major components of the thermal printing system as described herein.

In any thermal printer, specially manufactured paper is subjected to heat produced by electrical resistor elements which then results in a printed image. The paper consists of a base paper together with a color forming layer deposited thereon. The color forming layer consists of a water soluble binder which both adheres to the base paper and contains two color forming compounds, a colorless dye and a color developer. The colorless dye and the color developer fuse after the color forming layer is melted from the heat generated by resistor elements in contact with the paper. The resulting chemical reaction between the color developer and the dye produces a visible darkening of the paper of the same shape as the contacting resistor element.

The amount of darkening, or increased optical density, produced by imparting a given amount of heat to the paper is a measure of the thermal paper's sensitivity. One well-known sensitivity parameter is the thermal paper gamma, which is the slope of the straight line middle section of a curve which plots optical density versus applied energy, i.e. $\Delta$ optical density/$\Delta$ applied energy.

The particular type of thermal paper chosen for a given application depends on a number of factors. A paper with a high gamma requires little applied energy to produce an image with a high optical density. This both minimizes power consumption and means that small variations in paper sensitivity or printhead temperature will not make a noticeable change in the optical density of the resulting print.

On the other hand, for true gray-scale applications, which vary the density of the dots, a thermal paper with a lower gamma is preferable in order to produce the small variations in optical density corresponding to the level of gray desired. Also, a thermal paper with a lower gamma is more stable when subjected to environmental influences. For example, unimaged thermal paper can darken if exposed to high storage temperatures, high humidity, or strong sunlight. For both of these reasons, the present invention is designed to operate with lower sensitivity thermal paper.

Using low sensitivity thermal paper, however, requires a greater amount of thermal energy to be transferred to the paper by the printhead to image the paper than would be the case with higher sensitivity thermal paper. If this increased thermal energy is produced by simply increasing the current flowing through the resistor elements of the printhead, the useful life of the printhead is severely reduced. Therefore, the present invention uses a printhead attached to a block of aluminum whose temperature is regulated around a nominal value of 60° C. by heater strips vulcanized onto the aluminum block. The printhead is thus preheated by the aluminum block to what is called the printhead substrate temperature. This technique both extends the life of the resistor elements and ensures that the sum of the thermal energy transferred to the paper by the preheated printhead and the resistor elements is sufficient to image the paper.

Besides the paper sensitivity and printhead substrate temperature, the optical density of an image produced by a thermal printer depends on the thermal energy transferred to the paper by the resistor elements. The thermal energy transferred by each individual resistor element depends on both the magnitude of the voltage applied across the resistor elements and the time for which the voltage is applied. In the present invention, the width of the print strobe signal determines the time for which voltage is applied across the resistor elements. The strobe width is varied according to the recent history of the resistor element.

It takes a certain amount of time for a resistor element to cool down after being energized. By keeping track of which resistor elements were turned on in the previous line, and the elapsed time since the previous line was printed, the present invention can control the amount of additional heat required for each heater element. Then each element in the head transfers the correct amount of energy to the paper. This is especially important for gray-scale imaging.

Finally, the higher the thermal printhead supply voltage is adjusted, the darker the image. This voltage must be within limits specified by the head manufacturer or damage to the head will result. The head supply voltage is monitored by circuitry in the present invention, and is turned off if it goes beyond preset bounds. The head supply voltage is also automatically adjusted in accordance with the resistance of the resistor elements in the printhead.

B. Operational Description

The overall operation of the present invention is as shown in FIG. 1. A host computer communicates with the controller circuit board 10 of the printer via interface board 30 which provides a parallel port for receiving data and control bits. One of the control bits tells the printer whether it is to operate in gray scale mode or graphics mode. The controller circuit board 10 controls the operation of the printhead 50 in accordance with the received data and control bits. In the graphics mode, each byte of data received by the printer represents eight pixels or dots. One raster line comprises 216 bytes with each bit corresponding to one of the 1728 resistor elements of the printhead. Each byte received by the printer is stored in a memory located on the controller circuit board until the data is complete for one raster line. The data bits are then serially output to the printhead for printing. A "one" commands the corresponding resistor element to print when the printhead receives a strobe pulse.

In the gray scale mode, each of the two nibbles of a data byte corresponds to a single pixel. The four bits of each nibble signify one of sixteen shades of gray which is to be imaged by the resistor element. Thus, in the gray scale mode each raster line has 864 bytes. Once that amount of data is received and stored in memory, the bits of each nibble are logically ORed together and serially output to the printhead the same as in the graphics mode. In the gray scale mode, however, all four strobe signals are applied simultaneously. These strobe signals are chopped with sequential 25% duty cycle pulses to activate the resistor elements. The overall strobe width corresponds to the lightest shade of the 15 shades of gray which can be imaged by the printer. Each nibble stored in memory is then decremented by one and the procedure is repeated with strobe widths long enough to achieve the next shade of gray. Once a nibble is cleared ( i.e., all bits are zero), no further printing of that pixel is done. Thus, to achieve sixteen shades of gray (including white, which is no printing at all), data is shifted into the printhead fifteen times and printed or not printed accordingly.

The controller circuit board 10 also controls the printhead heater 51 which maintains the aluminum block, on which the printhead is mounted, at a specified temperature. This lessens the amount of current which each resistor element must draw in order to image the paper since each resistor element is maintained in a preheated state.

Also communicating with the controller circuit board 10 are the motor driver circuit board 70, the paper level board 80, and the top-of-form board 90.

The motor driver circuit board 70 contains the power drivers for the stepping motor that moves the paper. It also contains circuitry that controls all power to the printhead and controls the sequence in which the Vcc and VH voltages are applied and removed during the power-up and power-down stages. Vcc is the main power supply voltage for the electronic circuitry while VH is the printhead supply voltage which actually drives the resistor elements. The circuitry ensures that Vcc is supplied to the printhead as long as VH is present, even if the main Vcc supply fails. The VH supply is turned off if the controller circuit board 10 detects a fault condition, such as out of paper, high printhead temperature, high VH voltage, or printhead in open position.

The paper level circuit board 80 is mounted outside the right side of the paper supply storage compartment. It uses three photo-optical detectors to determine the amount of paper in the supply stack. When the level is diminished to less than 15% of a full paper supply, the output signals go to the controller circuit board for encoding and transmission to the host. Supply levels of roll materials are not monitored.

The top-of-form circuit board 90 is mounted on the underside of the cover of the paper transport. It has two photo-optical sensors. One of the sensors detects the black top-of-form marks which are pre-printed on the right edge of the back of the paper. This detector tells the controller circuit board that the top of a page has reached the printhead. A second detector simply looks for the presence of paper. When there is no paper in front of the detector, an out-of-paper signal is sent to the controller circuit board.

C. Electronic Component Description

What follows is a detailed description of the controller circuit board 10, and the printhead assembly 50. When describing signals, an all capital letter designation will be used. An asterisk, "*", appended to the end of the signal designation means the inverse of the signal designated without an asterisk. Also, certain logic functions are accomplished through the use of programmable array logic chips, or PAL's, which will be functionally described. PAL's are essentially chips which contain logic gates and registers which the user may configure as desired. The PAL's used in this preferred embodiment are manufactured by the Cypress Semiconductor Corporation.

1. Printhead Assembly

Figure 2:
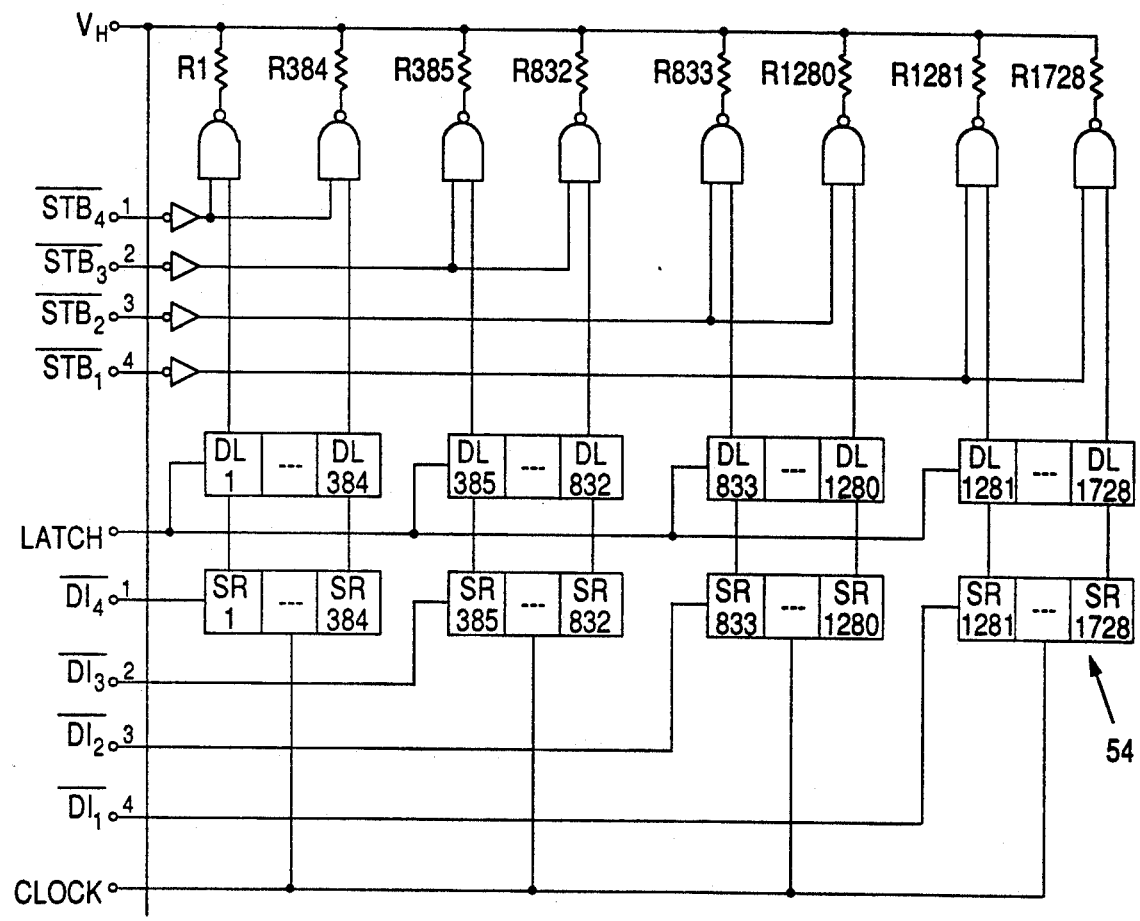
FIG. 2 is a schematic of the printhead.

The printhead assembly 50 is shown schematically in FIG. 1 as comprising three elements: a printhead heater 51, an over temperature sensing device 52, and the printhead 53. A schematic representation of printhead 53 is shown in FIG. 2. The thermal head resistor elements are divided into four segments which separately contain elements R1 to R384, elements R385 to R832, elements R833 to R1280, and elements R1281 to R1728.

Each segment has its own independent data and strobe inputs. Data is clocked onto each of the four data input lines (DIx where x=1, 2, 3, or 4) where it is stored by a shift register 54 (SR1-SR384, SR385-SR832, SR833-SR1280, SR1281-SR1728) internal to the head. After all the data has been input to the shift register 54, the data latch signal LATCH* is applied.

The data latch moves all of each segment's data from the shift registers into the data latches (DL1-DL384, DL385-DL832, DL833-DL1280, DL1281-DL1728), giving the printhead the equivalent of one raster line of memory. New data can be clocked into the shift registers while the data in the data latch is being printed.

Upon application of the data strobe pulse (STBx where x=1, 2, 3 or 4), all of the data residing in the data latch for a particular segment is moved to the head resistor elements, where it is printed on the paper by causing current pulses to be driven through the resistor elements by the printhead supply voltage, VH. The data strobes can be applied in three basic ways: sequential strobes, split strobes, and simultaneous strobes. Sequential and split strobes are used for "normal" logs where no gray scale is required. A sequential strobe occurs whenever the sum of the elements turned on in segments 1 and 2 or 3 and 4 exceeds 383. The data strobes for the two segments greater than 383 are then asserted sequentially. A split strobe occurs when the sum for segments 1 and 2 or 3 and 4 is less than 384 elements. In this case, the data strobes for the two segments less than 384 are asserted simultaneously.

For gray scale, the data in each segment are divided into sixteen groups—one for each level of gray. The strobes for all four segments are asserted simultaneously without drawing excessive power, since the strobe signals are chopped with sequential 25% duty cycle pulses. For gray scale printing, the data strobes must be asserted fifteen times for each individual raster line. (A gray scale of 0 requires no power to the resistor elements.) This is what causes the reduced speed (~1 inch/second) when doing gray scale imaging.

2. Controller Circuit Board

The controller board 10 interprets and controls the printing of data received from a host via the interface board 30.

In the graphics mode, the data for an image line consists of 216 bytes (one bit for each of the 1728 printhead elements). Bit 0 of byte 0 is printed at the left side of the paper, and bit 7 of byte 215 is printed at the right side of the paper. A "1" causes full density printing, and a "0" causes no printing.

In the gray scale mode, the data for an image line consists of 864 bytes, with one nibble for each printhead element. Nibble 0 of byte 0 is printed at the left side of the paper, and nibble 1 of byte 863 is printed at the right side of the paper. The image density is proportional to the nibble data value, with full density represented by "15" (i.e. four ones in binary) and minimum density by "0".

By shifting data output for image lines back and forth over a 28-bit range, element usage is evenly distributed, thus preventing premature wearing of some elements and under usage of others. At power-up, bit 0 of byte 0 is printed by the first printhead element. At each top-of-form, the data is shifted one bit, so that the first bit of the line is printed by element 1 for 12.5 inches, element 2 for 12.5 inches, and so on, until the data has been shifted 27 times. At this point the shifting is reversed until the first bit of the line is again printed by element 1. The process of moving the image back and forth is called "skewing", and the magnitude of the offset is "skew". To accommodate skew, the data to be printed is restricted to the first 1700 bits of the line. The remaining 28 bits of the line must be zeroes to allow skewing without losing printable data.

Figure 3:
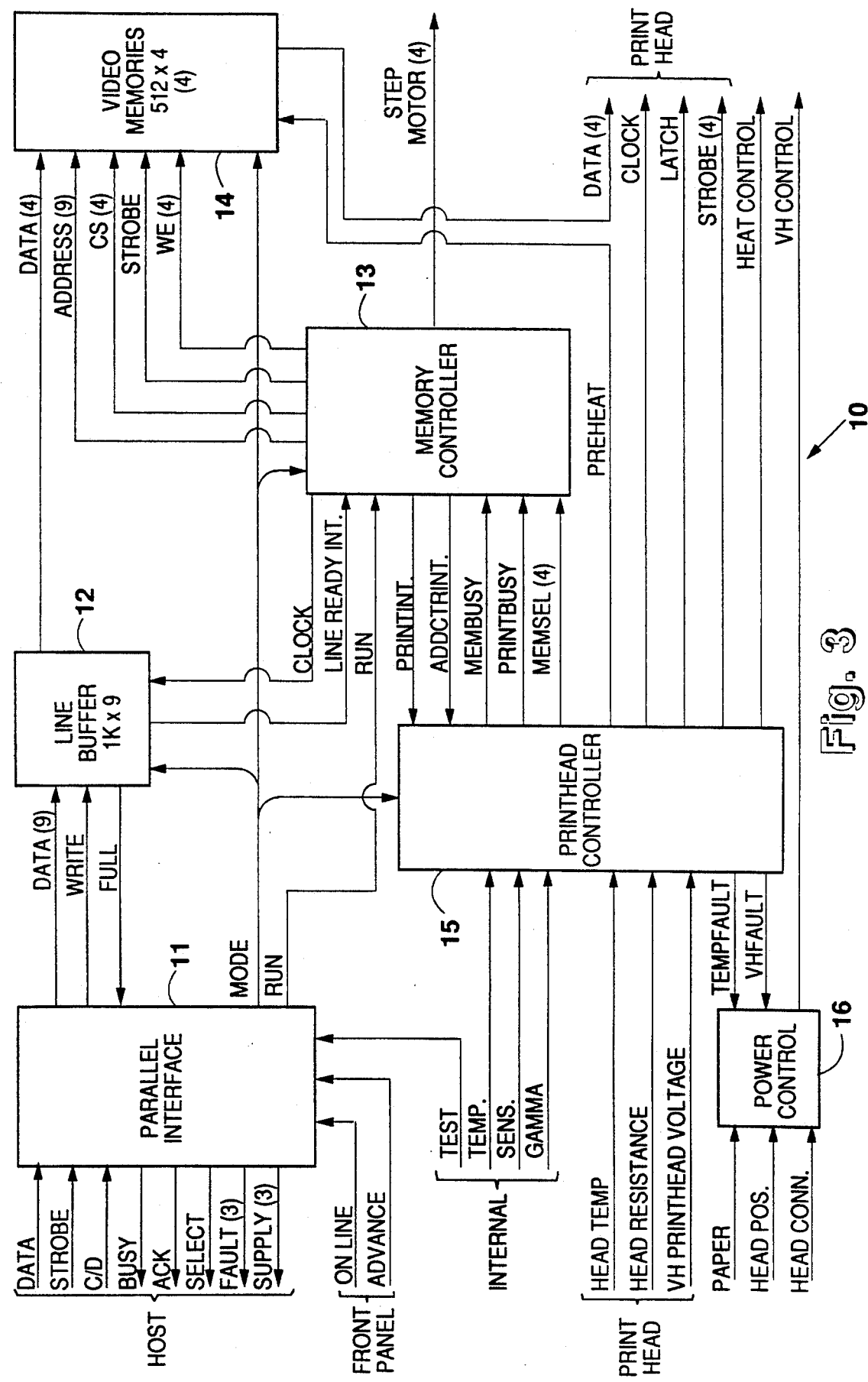
FIG. 3 is a block diagram of the controller circuit board.

FIG. 3 is a simplified block diagram of the controller circuit board 10. The six subsystems are parallel interface 11, line buffer 12, memories controller 13, video memory 14, printhead controller 15, and power control circuit 16. The data path is from the parallel interface 11 to the line buffer 12, from the line buffer 12 to the video memories 14, and finally from the video memory to the printhead 53 (FIG. 1).

The parallel interface 11 handles communication with the host computer (not shown) via the interface board 30 (FIG. 1). It separates data and control bytes received from the host computer, and decodes the mode (gray or graphics), end-of-line and top-of-form commands. The data bytes are counted and a flag bit (the 9th bit) is added to the first byte of the data for each line sent to the line buffer. If an end-of-line command is received before expected, the line is completed with dummy zero-value bytes. Six status lines are used to send information on faults and paper supply level to the host.

The line buffer 12 temporarily stores data received from the parallel interface when the video memories are busy printing. The line buffer 12 uses a 1 k by 9-bit FIFO operating completely asynchronously to accept data when not full and output data when not empty. The flag bit in the first byte of each line is recognized to generate a LINEREADY* signal. This signal informs the memory controller 13 that the first byte of a line is ready for transfer to memory. When the memory controller 13 returns a FIFIOUTEN* signal (FIG. 9), the line buffer 12 sends the data to the video memories 14. In graphics mode, the 216 bytes representing a line, are converted to 1728 serial bits (actually 1728 nibbles of which only bit 0 contains useful data). In gray scale mode, the 864 bytes, together representing a line, are converted to 1728 nibbles.

The memory controller circuit 13, whose main component is an Intel 8751 microprocessor, controls the transfer of data from the line buffer 12 to the video memories 14, and from there to the printhead 53 (FIG. 1). This process begins when video memories 14 receives a LINEREADY* flag (FIG. 6) from the line buffer. This signals that the first byte of data for a new line is output to the line buffer.

As explained further below, video memories 14 actually is comprised of four identical memory circuits. The memory controller 13 transfers the first 384 nibbles to a first video memory circuit of video memories 14 (actually 384 minus skew in locations skew through 383), the next 448 nibbles to a second video memory circuit of video memories 14, the following 448 nibbles to a third video memory circuit of video memories 14, and the last 448 nibbles to a fourth video memory circuit of video memories 14. A number of zero-value bits equal to skew are then sent to the first video memory to be written in locations skew −1 through 0. This removes the remaining data for the current image line from the line buffer 12.

The memory controller 13 supplies common address lines to all four of the memory circuits of video memories 14. Memory selection uses individual chip select and write enable signals (see FIG. 12). When data for a complete line is written to the memories, a PRINTINT* (print interrupt) command signal is sent to the printhead controller 15. The memory controller 13 also generates the phase drive signals for the stepping motor 100 (FIG. 7) to move the paper.

The video memories 14 contain four identical memory circuits, each of which supplies data to one segment of the printhead. Each memory circuit consists of a 1 k by 4-bit static RAM and a PAL. Only the lowest 448 locations of each RAM are used. The PAL is used to perform logical operations on the data as it is entered and retrieved from memory. The first of the four memory circuits supplies data to elements 1-384 of printhead 53 while the second supplies elements 385-832, the third supplies elements 833-1280, and the fourth supplies elements 1280-1728.

When entering data in a memory in the graphics mode, a read-modify-write operation is performed at each location. As each bit is received from line buffer 12, memory controller 13 ANDs that bit with the inverse of the bit previously stored as the .second bit of the nibble in the memory location corresponding to that pixel and writes that value as the first bit. The bit from the line buffer 12 is then written as the second bit of the nibble while the third and fourth bits are cleared. When entering data in gray scale mode, the nibble is written as received from the line buffer 12 without modification.

In the actual printing operation, data are retrieved from the video memories 14 and sent to the printhead 53 (FIG. 1) as a serial bit stream. In the graphics mode, data from memory bit 0 are transferred to the head and printed, then data from memory bit 1 are transferred and printed. In gray scale mode there are fifteen transfer and print operations. At each transfer, the PAL sends the logical OR of all four data bits to the printhead 53 (FIG. 1), subtracts 1 from the data, and rewrites this value in memory. The PAL is used as a code converter to perform the subtraction.

The printhead controller 15 selectively controls the transfer of data from the video memories 14 to the printhead 53 (FIG. 1) and generates the print strobe signals (STBx*) to print. It can transfer data to each section of the head independently and generate independent strobe signals (STBx*) for each segment printhead 53 (FIG. 1). The width of the strobe signals is a function of mode, paper sensitivity and gamma, printhead temperature, ambient temperature, and the time elapsed since the previous line was printed. A multiplexer/A-D converter is used to supply data from all analog sensors to the 8751 microprocessor which controls the printing process.

In a typical graphics mode, the first bits (bit 0) of each nibble in the first two of video memories 14 are serially transferred to the shift registers 54 (FIG. 2) of printhead 53 (FIG. 1). A latch pulse is generated to latch the values of bit 0 in the data latches (DLX, FIG. 2). Strobe signals STBx are then asserted for a "prestrobe" number of microseconds to generate a preliminary current pulse through those resistor elements. "Prestrobe" is a variable value calculated by the 8751 microprocessor. This operation effectively brings the temperature of the resistor elements not used on the previous line to the temperature of those resistor elements used on the previous line as only the former are strobed. The second bits of each nibble in the first two memories, which correspond to the data for the present raster line, are then shifted into the printhead and latched as above. Strobe signals STBx for elements of the first two segments are then asserted for "mainstrobe" number of microseconds where "mainstrobe" is the value of the strobe width necessary to raise the temperature of the resistor elements to a level which effects full density printing. The procedure is then repeated for the third and fourth memories of video memories 14 which causes the third and fourth printhead segments to print. If the number of dots for either pair of printhead segments exceed 383, however, those segments are printed separately. A dot counter counts the number of ones received from line buffer 12 and written into the video memories 14 for each raster line. A flag signal is asserted when any pair of segments is to print more than 383 dots and causes the printhead controller 15 to effect the separate printing of those particular segments.

In the gray scale mode, all the data from each nibble in the four memories of video memories 14 are logically ORed together, resulting in one bit per nibble. These bits are then shifted into all four shift registers 54 (FIG. 2) of the printhead simultaneously and latched. Strobe signals STB1, STB2, STB3, and STB4 are then asserted for a "basestrobe" number of microseconds where "basestrobe" is the strobe width necessary to print the lighted shade of gray. At the same time the strobe signals are asserted, each nibble in the first of the four memories is decremented by one, the bits of each nibble are ORed together, and the resulting bits are shifted into the printhead as above. The data are then latched and all four strobe signals are asserted for an "increment strobe" number of microseconds where "increment strobe" is the strobe width necessary to print the next darker shade of gray. The sequence is repeated until a total of fifteen data shifts and strobes have taken place. The decrementing of each nibble before a subsequent strobe is not a true subtraction but rather a code coilversion. Once a nibble is cleared, no further subtraction occurs and no further printing is done for that pixel. As noted above, the strobe signals are chopped with sequential 25% duty cycle pulses so that each strobe is only active 25% of the time.

The printhead controller 15 generates the chip select signals that determine which of the four memories of memories 14 is to supply data to the printhead. The addressing of these video memories during output operations, however, is still done by the memory controller 13. During all output operations, data are extracted from each memory starting with the highest address and ending with the lowest. In this way, the last element of the raster line will be printed at the right side of the paper. Each memory chip is addressed starting with the 448th location during output operations and ending with the first location. Because the first of the four printhead segments has only 384 elements, only 384 locations in the first of the four video memories 14 are ever stored with printable data. The data in the 384th through 447th locations of video memories 14 are essentially dummy values which are discarded as the data is shifted into printhead shift register 54 (FIG. 2). All memories of video memories 14 are cleared by a master reset signal at power-up and each time the top-of-form signal is asserted.

The following is a detailed description of each of the subsystems which make up the controller circuit board: the parallel interface 11, line buffer 12, memory controller 13, video memory 14, and printhead controller 15.

a. Parallel Interface.

The parallel interface 11 is itself made up of two principle subcomponents: an input circuit 11a (FIG. 4) and byte counter/interpreter 11b (FIG. 5). Input circuit 11a receives and latches data signals D0 through D7 from interface circuit 30 (FIGS. 4 and 5) which were originally transmitted by the host computer and also generates handshaking signals to be sent back to the host by interface circuit 30.

Byte counter/interpreter 11b processes the received data signals D0 through D7 according to whether the control bit, CONTROL* sent by the host is high or low. When CONTROL* is asserted, the data signals are interpreted as a control byte and the process proceeds accordingly. Otherwise, the signals are a data byte, and the number of bytes received for each image line is counted.

Input circuit 11a is diagrammed in FIG. 4. All incoming signals are buffered by 74LS14 Schmitt Triggers (U02A and U02B) (not shown). The leading edge of the STROBEIN* signal triggers flip-flop U15C. This causes PAL U04A to clock the input data (D0–D7) into Latch U04D, and to generate the interface response signals BUSY* and ACK* and the CONTROL*, T2*, and T3* signals which are used by byte counter/interpret 11b (FIG. 5) to separate data and control bytes.

BUSY* is asserted during each transaction and when the FIFO memory of line buffer 12 (U0F, FIG. 6) is full (FIFOFULL* asserted), when OFFLINECLR is asserted (unit is offline or being reset), or if RUN is asserted (paper is being moved to top-of-form). BUSY* is sent back to the host, and is also the "D" input of the strobe flip-flop U15C. A typical byte transfer transaction is completed in less than eight cycles of the 8 MHz clock, so the interface call handle peak data transfer rates of one megabyte per second.

FIG. 5 depicts byte counter/interpreter 11b. The byte-counter, comprised of U05C, U05B, and U05D, is used to count the number of bytes received for each image line. The counter is initially preset to 215 in the graphics mode or to 863 in the gray scale mode. The counter is decremented after each data byte is written into the line buffer 12. After the 216th (864th in the gray scale mode) byte is written, the counter underflows. The U03D PAL detects this condition and generates a BYTECTRLD* signal to present the byte-counter. BYTECTRLD* simultaneously sets the flag flip-flop of U05E1 to generate a DATA8 signal. This flag bit is written in the ninth bit of the first byte of an image line in line buffer 12. A BYTECTRLD* signal is also generated each time the MR (master reset) signal is asserted. This occurs at power-up, and each time the paper is advanced to top-of-form. The T2*, T3*, CONTROL*, and DATA 0-7 signals are processed by PAL U04C to provide the FIFOWR* (FIFO WRite), byte-counter clock (BCC), EOL, TOF and MODE signals. When CONTROL* is not asserted, T2* is gated out as FIFOWR*, and T3* is gated out as the byte-counter clock. Data stored in latch U04D (FIG. 4) are written into the buffer (U04F, FIG. 6) at the rising edge of FIFOWR*. The byte-counter is decremented at the rising edge of the byte-counter clock signal.

When CONTROL* is asserted, T2* is used to clock bit 3 of the control byte into the mode flip-flop U06C. The resulting output of U06C, MODE, is high for gray scale mode and low for graphics mode. If bit 2 of the control bit is a "one", T2* is used to set the TOF U05E2 flip-flop U05E. The TOF flip-flop is also set whenever the ADVANCE* signal is asserted. The TOF flip-flop is cleared by the TOFDET signal from the TOF board 90 (FIG. 1). This occurs at the beginning of the first TOF mark detected after a TOF command from the host, or the beginning of the first mark which is detected after ADVANCE* is deasserted. If bit 1 of the control byte is a "1" while CONTROL* is asserted, T3* is output from U04C to U03D as an EOL (end of line) signal. In normal operation, the DATA8 signal from the flag flip-flop U05E1 should always be asserted (high) when an EOL signal occurs. If this is not the case, PAL U03D generates a SHORTLINE* signal. This signal causes the generation of enough dummy bytes to complete a normal length line.

b. Line Buffer.

Figure 6:
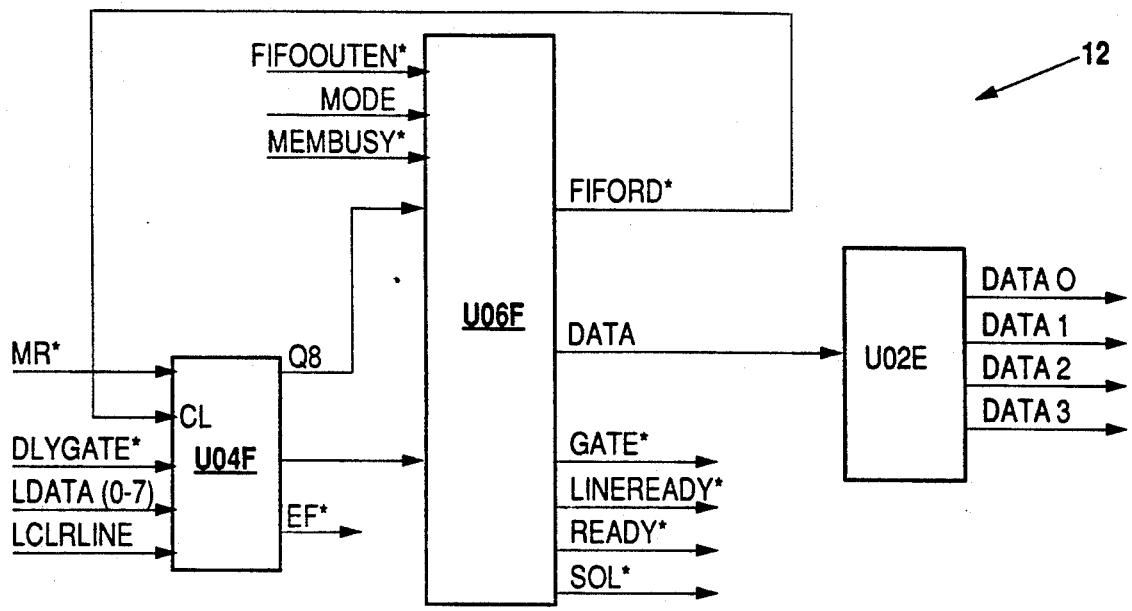
FIG. 6 is a schematic of the line buffer circuit.

FIG. 6 is a diagram of the line buffer circuit 12. U04F is a 1k by 9-bit FIFO (i.e., a First In First Out memory) serving as a rate buffer for storing data from the host computer before its entry into the video memories 14. In the graphics mode, data from buffer U04F are converted from parallel to serial form as they are transferred to the video memories 14. In gray scale mode, each byte is transferred as two 4-bit nibbles. Two are registered PALs (not shown) serve as registers for the parallel-to-serial and byte-to-nibble conversion. In graphics mode, they are configured as an 8-bit parallel-in, serial-out shift register. In grey scale mode, they are configured as two 4-bit, tri-state latches with common outputs. A bit-counter, (not shown), and PAL U06F, control the conversion and transfer process. U02E inverts the DATA0-3 signals to active high form.

The signals for the line buffer-to-video memory transfer process are as follows: Q8 is the bit 8 output of buffer U04F which is a tri-stated output, except during a FIFORD* pulse. A high Q8 during FIFORD* indicates that the first byte of a line is present at the FIFO output. MEMBUSY* originates from the printhead controller 15 (FIG. 3) and indicates that the video memories 14 are being used to output data to the printhead. Data can be input to the memories only when MEMBUSY* is high. MR* is the master reset signal and is asserted immediately after INITRESET* (FIG. 10) at power-up, and each time the paper is advanced to the TOF mark without printing. FIFOOUTEN* originates from the memory controller 13 and indicates that data can be accepted in response to LINEREADY*. It is not asserted continuously during the transfer of a line, but is interrupted four times, usually not at byte boundaries (due to skewing). GRAY MODE is the mode signal indicating the mode of operation selected by the host device. This signal is high in gray scale mode, and low in graphics mode. EF* is low when buffer U04F is empty, and is high whenever data is available at the output of buffer U04F.

FIFORD* is used to strobe data out of buffer U04F. It is generated on alternate 4 MHz clock cycles when FIFOOUTEN* and READY* and SOL* and LINEREADY* and EF* are not asserted. Under normal conditions, the first byte of a line appears with the first such FIFORD*. But to avoid "lock up" from noise, soft failures, and subsequent lost synchronization, read signals are generated until the first byte of a line is detected (SOL*, start of line, is asserted). During the transfer of a line (READY* asserted), a FIFORD* signal is generated immediately after each byte is transferred (when GATE* is cleared). CTRRESET* a signal, which is the logical OR of FIFORD* and inverted READY*, clears the bit counter. The bit-counter is held in a cleared state whenever READY* is high, and is cleared by FI- FORD* when each new byte is retrieved from buffer U04F. SOL* is the start-of-line signal which is asserted when a high is detected at Q8 of buffer U04F, and cleared after LINEREADY* is asserted. SOL* indicates that the first byte of a line has been clocked into the two parallel-to-series/byte-to-nibble curve (not shown). LINEREADY* indicates to the memory controller 13 that the first byte of a line is available for transfer. LINEREADY* is asserted when SOL* is low and READY* is high and is cleared when FIFOOUTEN* signal goes low. READY* is asserted during the transfer of a line of data and when LINEREADY* and FIFOOUTEN* are both low. It is cleared when MEMBUSY* goes high.

Figure 9:
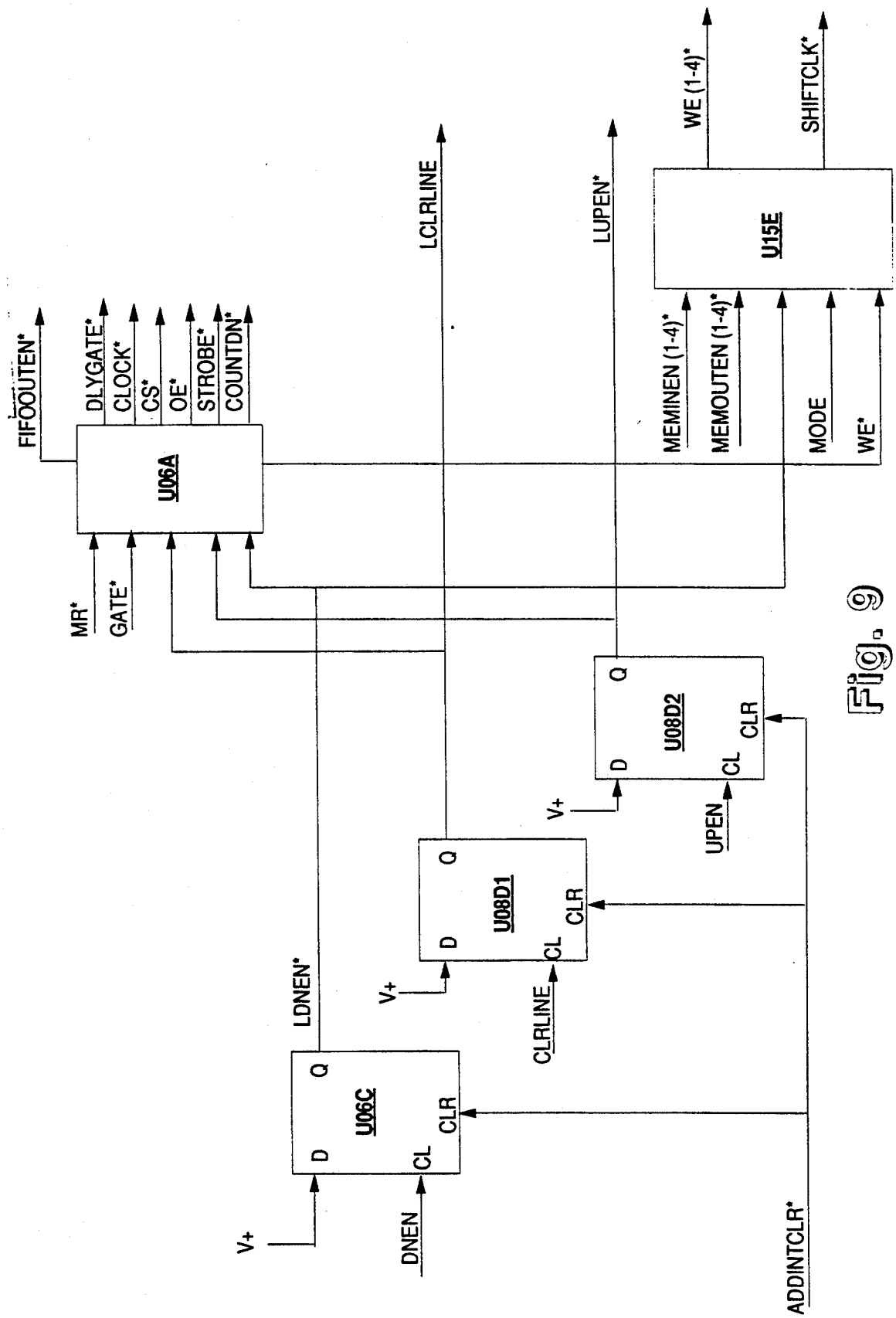
FIG. 9 is a schematic of the command latch flip-flops and associated PAL components of the memory controller circuit.

GATE* is asserted during the transfer of each data byte and simultaneously at the beginning of a line with READY*, when both LINEREADY* and FIFOOUTEN* are low. After the first byte is transferred, it is asserted immediately following each FIFORD* (unless Q8 is asserted). It is selectively cleared by the counter. In gray scale mode, it is cleared when QB of the bit counter goes high. GATE* enables the generation of memory chip select, output enable, write enable and address counter clock signals by U06A (FIG. 9) in the memory controller circuit 13. DLYGATE* is the GATE* signal delayed by one 16 MHz clock period (62.5 nanoseconds). This signal controls the entry and shifting of data in two parallel-to-serial/byte-to-nibble conversion registers U02F and U01F. When DLYGATE* is high, data is clocked into the registers. When it is low, the data is shifted through the registers to convert from parallel to serial form. DLYGATE* is generated in U06A (FIG. 9). A signal (not shown) PALCLK*, which is the logical OR of FIFORD* and CLOCK* ANDed with FIFOUTEN*, is used to clock the data from the FIFO into those registers. The rising edge of FIFORD* clocks the data from buffer U04F into the registers, and the CLOCK* pulses which occur during FIFOUTEN* shift the data out of the registers to the memory controller 13. This signal is inhibited when SOL* is asserted. This provision is made for the unusual case which may occur if the first byte of a line is retrieved from buffer U04F while the previous line is still in the process of being transferred to memory. In this case, zeroes are transferred to memory until the transfer of the current line is complete, and the data byte which was clocked into the registers is held until the transfer of the next line is started.

Two signals NIBBLE0SEL* and NIBBLE1SEL* (not shown), serve to configure the two registered PALs in the gray scale and graphics modes as described above.

NIBBLE0SEL* controls the registered outputs of the PAL registers. This signal is always low in graphics mode. In gray scale mode, it is low when the controlling output of the bit-counter is low, and high when the controlling output is high. When low, the registered outputs (Data 0–Data 3) of the PAL register are active. When high, registered outputs are tri-stared. NIBBLE1SEL* controls the registered outputs of the other PAL register. It is the inversion of NIBBLE0SEL*. LCLRLINE tri-states the outputs of both PAL registers. This results in zero-value data being supplied to the first of memories 14 while the remnants of the data for an image line are clocked out of the FIFO. This signal comes from the memory controller 13, is always accompanied by a FIFOOUTEN* signal, and is asserted after the transfer of data into the fourth of memories 14 is completed.

c. Memory Controller

The memory controller circuit 13 is shown in FIGS. 7, 8, 9, 10, and 11. The major components are: an 8751 microprocessor U13D (FIG. 7); the address counter comprising U14D, (FIG. 8); the command-latch flip-flops U08D1, U08D2 and U06C shown in FIG. 9; the PALs generating the memory-chip control signals U06A, U15E also shown in FIG. 9; the interrupt and reset components U11E and U07E shown in FIG. 10; and the dot counter components comprising U07G and U08G shown in FIG. 11.

The following events occur when transferring a line of data from the line buffer to the video memories 14. The LINEREADY* signal from the line buffer 12 is asserted, indicating that the first byte of data for an image line is ready for transfer. If the MEMBUSY* signal from the printhead controller is not asserted, PAL U15D (FIG. 7) delivers a MEMENTERINT* signal to the 8751 microprocessor U13D. The microprocessor U13D presets the address counter to a number equal to skew by setting PRESET 0-7 to SKEW, then asserting ADDCTRLD*. The microprocessor U13D asserts MEMINEN1* to select the first of the memories 14 for data entry, then asserts UPEN to start the data entry. The rising edge at the UPEN signal of flip-flop U08D2 (FIG. 9) triggers the flip-flop, causing LUPEN* to be asserted. This signal is clocked into PAL U06A (FIG. 9) and emerges as FIFOOUTEN* and (FIFO out enable), respectively, which goes to the line buffer circuit 12. The GATE* signal is asserted by line buffer 12 and inputs to PAL U06A as shown in FIG. 9.

Figure 10:
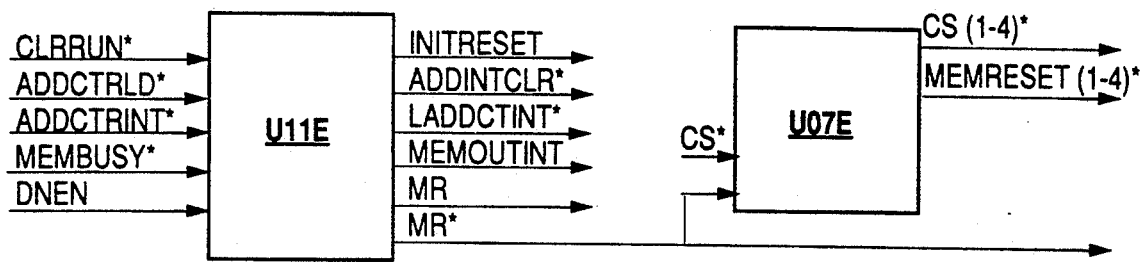
FIG. 10 is a schematic of the interrupt and reset components of the memory controller circuit.

While GATE* and FIFOUTEN* are both asserted, U06A generates CLOCK*, CS* (memory chip select) OE* (memory output enable), STROBE*, and WE* (memory write enable) signals. CLOCK* is sent back to the line buffer circuit 12 and to PAL U14E (FIG. 8) from which it emerges as the CU (count up) input clock signal for the address counter. The counter advances on the trailing edge of each CLOCK* pulse. CS* is separated into individual chip-select signals for the four video memories of video memories 14 in PAL U07E as shown in FIG. 10. The OE* and STROBE* signals (FIG. 9) are sent directly to all four of the video memories. The WE* signal is separated into individual WE* signals for each video memory by PAL U15E as shown in FIG. 9.

In graphics mode, WE1* is enabled only when MEMINEN1* is asserted, WE2* is enabled only when MEMINEN2* is asserted, WE3* is enabled only when MEMINEN3* is asserted, and WE4* is enabled only when MEMINEN4* is asserted. In gray scale mode, a specific WE* signal is enabled when either its corresponding MEMINEN* or MEMOUTEN* (MEMory OUTput ENable) signal is asserted.

Figure 7:
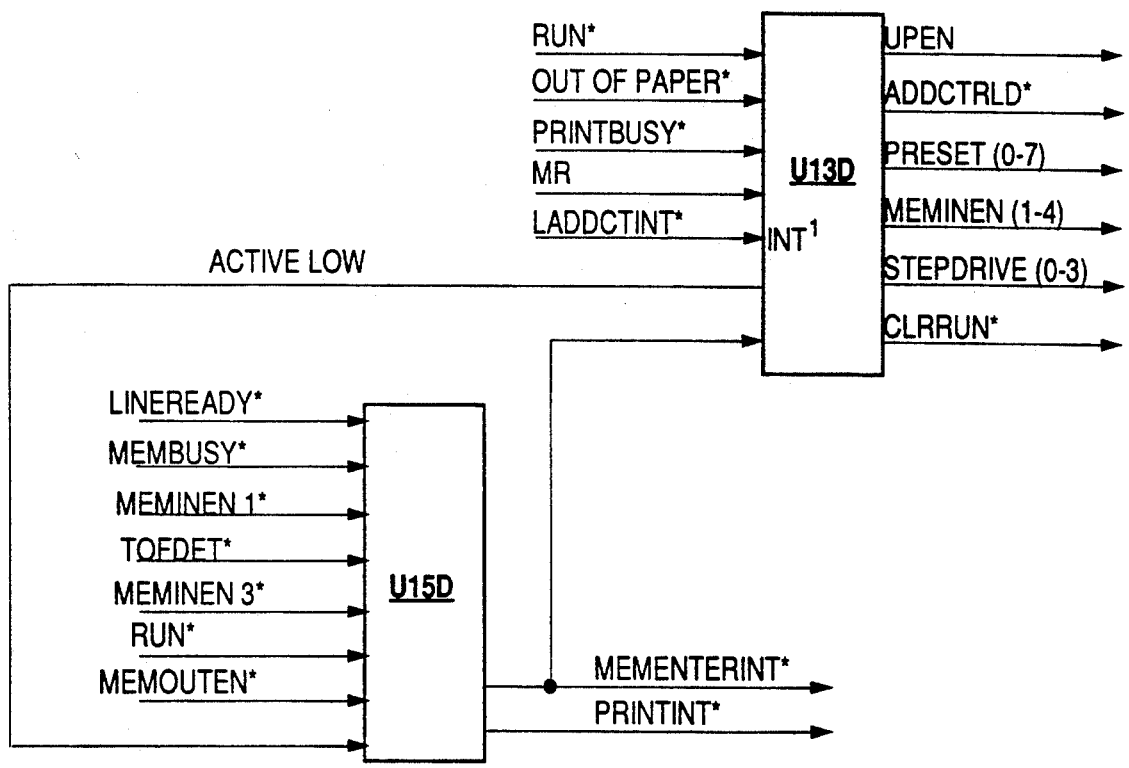
FIG. 7 is a schematic of the microprocessor used in the memory controller circuit.
Figure 8:
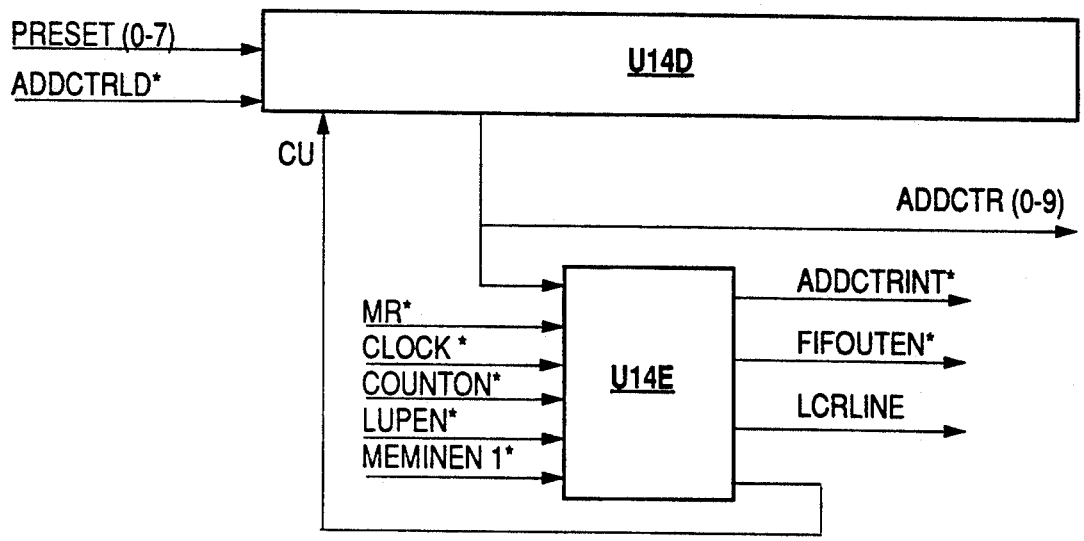
FIG. 8 is a schematic of the address counter of the memory controller circuit.

The data transfer process continues until the address counter reaches 384. PAL U14E decodes this number and generates the ADDCTRINT* signal that indicates that the transfer of the first of the four data to video memories 14 should be stopped. The ADDCTRINT* signal has many false decoding spikes in addition to the desired signal. It is clocked into a register of PAL U11E (FIG. 10) to remove the false spikes, and is latched there until a new ADDCTRLD* signal is generated by the microprocessor. The resulting signal, LADDCTINT*, goes to the INT1 input of the 8751 microprocessor, U13D (FIG. 7).

ADDINTCLR* (address interrupt clear) from U11E (FIG. 10) is the logical OR with LADDCTINT* of MR*. ADDINTCLR* resets the command-latch flip-flops, U06C, U08D1 and U08D2, (FIG. 9 to terminate the LUPEN* signal. Applying the logical OR with MR* and LADDCTINT* insures that all three command-latch flip-flops, U06C, U08D1 and U08D2, are cleared at power-up. Responding to LADDCTINT*, the microprocessor U13D presets the address counter to zero, asserts MEMINEN2*, and then asserts UPEN, to start the process of entering data into the second of the four video memories 14. This process is stopped when the address counter reaches 448, as decoded by U14E (FIG. 8), and repeated for the third and the fourth video memories of video memories 14. The address counter is preset to zero when U14E detects a terminal count of 448.

When the microprocessor U13D receives the LADDCTINT* signal at the end of data entry into the fourth video memory of memories 14, it presets the address counter to SKEW −1, asserts MEMINEN1*, and then asserts CLRLINE. This triggers the CLRLINE command-latch flip-flop U08D1 (FIG. 9), asserting the LCLRLINE (latched clear line) signal at U08D1. LCLRLINE goes to the line buffer 12 where it constrains the output data to be all zeroes, and to PAL U06A. U06A asserts FIFOOUTEN* and COUNTDN* (countdown) while LCLRLINE is asserted. FIFOOUTEN* enables the line buffer 12 to send data to the video memories 14 and GATE* to the memory controller 13. COUNTDN* goes to PAL U14E, where it causes the CLOCK* signal to be routed to the countdown input of the address counter. With COUNTDN* asserted, U14E generates ADDCTRINT* when the address counter underflows, as indicated by signal ADDCTR9 going high. The result of CLRLINE is that zero-valise data is written into the first of the four video memories 14 in addresses SKEW−1 through 0 as the address counter counts down.

The final event in the transfer of data from the line buffer 12 to the video memories 14 is the generation of a PRINTINT* (print interrupt) interrupt signal telling the printhead controller 15 to print the data. Microcontroller U13D generates an active-low signal which is clocked into a register of PAL U15D. The resulting PRINTINT* signal is latched in the register until the MEMOUTEN1* (memory output enable) signal is received from the printhead controller 15. The MEMOUTEN1* signal indicates that the printhead controller 15 has received the interrupt, and has started the printing operation.

Next, the output operations of the memory controller are described. During printing operations, the memory controller 13 controls the addressing, but not the selection of memories. It also generates interrupts for use by the printhead controller 15, as well as for its own use. During output operations, the address counter is always preset to 447 and counted down through zero. ADDCTRINT* signals are generated when the counter underflows.

All output operations begin with the printhead controller 15 (FIG. 3) asserting DNEN (down enable) (FIG. 9). DNEN triggers the down enable command-latch flip-flop U06C, causing LDNEN* (latched down enable) to go low from U06C. LDNEN* remains low until the command-latch flip-flops are reset by the AD-DINTCLR* signal when the address counter underflows. LDNEN* enables PAL U06A to generate the CLOCK*, CS*, OE*, STROBE*, WE*, and COUNTDN* signals. It also enables PAL U15E to output the SHIFTCLK* (shift clock) signal in either mode, and the individual WE* signals in gray scale mode. SHIFTCLK* is simply WE* gated with LDNEN. SHIFTCLK* is sent to the printhead controller 15 to shift data from the video memories 14 to the printhead 53. The MEMOUTENx* signals controlling the selection of WE* by U15E originate in the printhead controller 15. While COUNTDN* is asserted, PAL U14E (FIG. 8) routes the CLOCK* signal to the countdown input of the address counter and selects ADDCTR9 high as the condition for generating the ADDCTRINT* signal.

As with the memory input operations, PAL U11E (FIG. 10) generates the LADDCTINT* signal. During memory output operations, it also generates the MEMOUTINT* (memory output interrupt) interrupt signal which tells the printhead controller 15 that the current output operation is complete. While MEMBUSY* (memory busy) is asserted, indicating that the memories are being used for output operations, LADDCTINT* is clocked into a register of PAL U11E when ADDCTRLD* is asserted. The resulting MEMOUTINT* signal is latched there until the printhead controller 15 asserts the DNEN signaling the receipt of the interrupt the next operation had been ordered.

Figure 11:
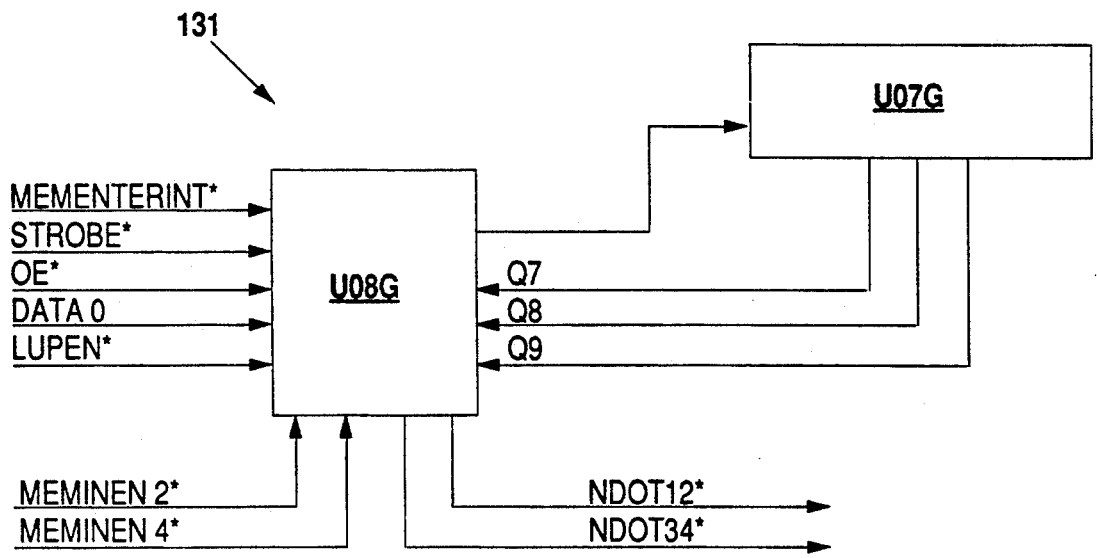
FIG. 11 is a schematic of the dot counter components of the memory controller circuit.

The dot counter circuit 131 (FIG. 11) counts the number of ones written into memory during each time image line data is transferred from the line buffer 12 to the video memories 14. If the total number written into memory 1 and 2, of video memories 14 exceeds 383, a signal called NDOT 14AB (number of dots in the first two memories 1 and 2, of video memories 14) is asserted. If the total number written in the third and fourth memories of video memories 14 exceeds 383, a signal called NDOT34 and (number of dots in memories 3 and 4) is asserted. These signals are sent to the printhead controller 15, which uses the information to decide whether to print the data in all four memories simultaneously or sequentially. The dot counter circuit 131 consists of a PAL U08G and a 12-stage binary counter U07G, and is shown in FIG. 11. The PAL gates each "1" appearing in the DATA0 signal (from the line buffer) 12 to the clock input of the counter. If the number in the counter exceeds 383 while MEMINEN2* is asserted (Q7 and Q8 high or Q9 high), one of the PAL's register is asserted and held latched. Similarly, if the number in the counter exceeds 383 while MEMINEN4* is asserted, another of the PAL's registers is asserted and held latched. A counter reset signal is generated by the PAL when MEMENTERINT* occurs (just before transfer of data to the first memory of memories 14), and at the end of MEMINEN2* (just before data is transferred to the third memory of memories 1. Both NDOT12 and NDOT34 are cleared by MEMENTERINT* at the beginning of transfer of data for the next image line.

Microprocessor U13D in FIG. 7 controls the stepping motor by generating the four STEPDRIVEx signals. The motor is operated in the half-step mode, and makes two 0.9 degree (0.0025 inch) steps per image line. In addition to causing the motor to advance two half-steps per image line, the memory controller must also run the step motor when RUN* signal is asserted. In this case, the microprocessor makes use of a timing loop to generate half-steps at approximately 1.25 millisecond intervals. When the OUT-OF-PAPER* signal is asserted, the microprocessor holds the STEPDRIVE signals in their current state, titus inhibiting the motor from rotating. The RUN flip-flop in the parallel interface 11 is normally cleared by the first TOF mark detected. As a safety feature, in case the mark detector fails, or unmarked paper is used, microprocessor U13D asserts CLRRUN* (clear run) after 5000 half-steps (12.5 inches). CLRRUN* causes U11E to generate reset signals which reset everything on the controller board.

d. Video Memories

Figure 12:
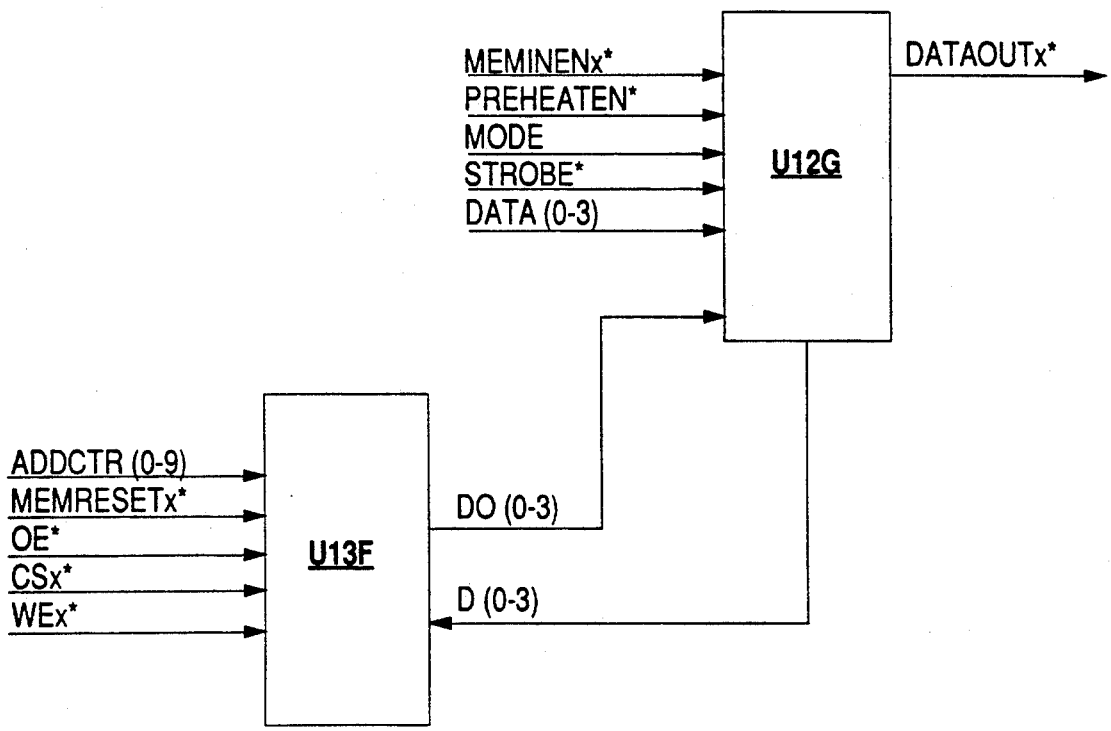
FIG. 12 is a schematic of the video memory circuitry.

The four video memory circuits of video memories 14 will now be discussed. Because they are identical, only one is shown in FIG. 12. The memory circuit consists of a 4-bit by 1k static RAM U13F and a PAL U18G. The address (ADDCTR 0-9) PREHEATEN* (PREHEAT ENable), GRAY, STROBE*, data (DATA 0-3), and OE* signals are common to all four memory circuits. Individual MEMINENx* MEMRESETx* CSx* and WEx* signals are supplied to each memory circuit, and each circuit has a unique DATAOUTx* output signal. The memory controller 13 is the source of the ADDCTR 0-9, STROBE*, OE*, MEMINEN*, MEMRESET*, CS*, and WE* signals. The parallel interface 11 is the source of the GRAY signal. The line buffer 12 is the source of the DATA 0-3 signals. The printhead controller 15 is the source of the PREHEATEN* (PREHEAT ENable) signal. The DATAOUT* signals go to the printhead controller.

In both input and output operations, the memory controller 13 supplies signals to allow a complete "read-modify-write" cycle at each valid memory address. The input data path is from the line buffer 12 to the memory via the PAL. The output data path is from the memory to the printhead controller 15 via the PAL. The function performed by the PAL depends on the mode, as indicated by the GRAY signal, and whether data is being input to or output from the memory, as determined by the state of the MEMINEN signal.

In graphics mode, only bit DATA0 of the line buffer 12 nibbles is used, and bits 1-3 are not. DATA0 is written in bit D1 and DATA0 ANDed with the inverse of D01 is written in bit D0 of the memory at each relevant address. In graphics mode memory output operations, bit DO0 is routed to the DATAOUT* output when PREHEATEN* is low, and bit DO1 is routed to the output when PREHEATEN* is high. This data is valid while OE is low. In gray scale mode memory input operations, the data from the line buffer is written into the memory without modifications—DATA0 to D0, DATA1 to D1, DATA2 to D2, and DATA3 to D3. In gray scale mode memory output operations, as data is retrieved from the memory, the logical OR is applied to the DO9, DO1, DO2, and DO3 bits to form the DATAOUT signal. The DO nibble value is modified by subtracting 1, and the modified data is written back to the same location in memory. The PAL is used to modify the data to be rewritten in memory. It does not function as a true subtractor, but as a code converter. For example, it converts 15 to 14, 14 to 13, et cetera. The DOx and DATAOUT* levels are valid while OE* is low, and the Dx levels are valid after STROBE* goes high.

e. Printhead Controller

Figure 13:
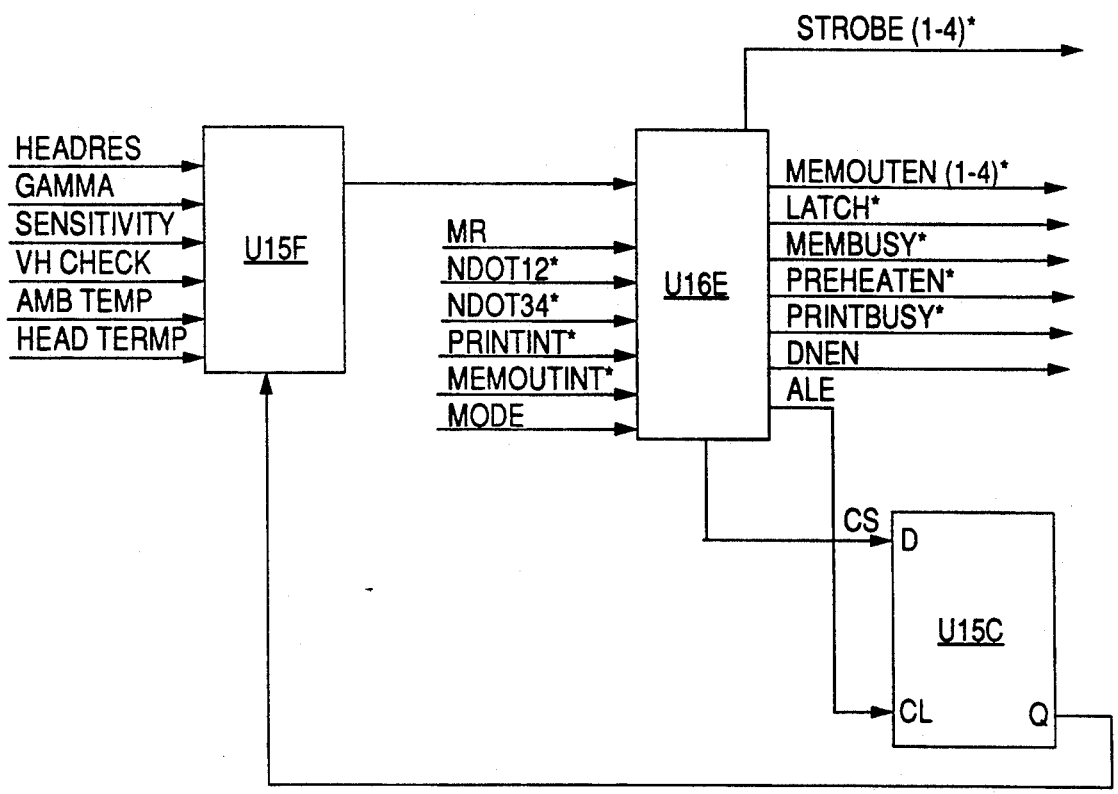
FIG. 13 is a schematic of the microprocessor used in the printhead controller circuit.
Figure 14A:
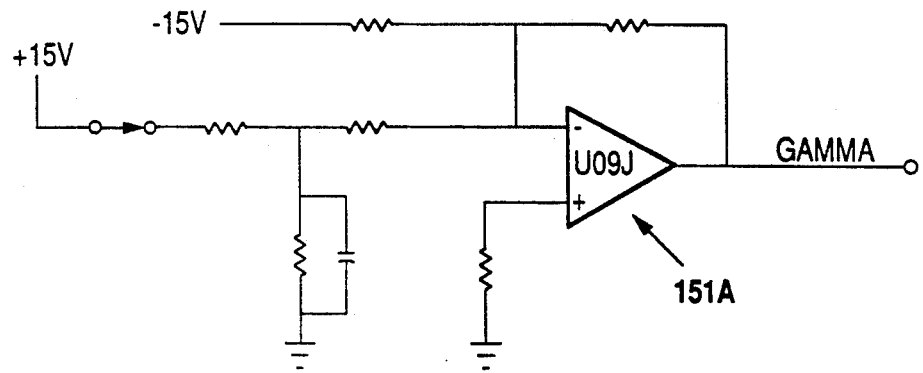
FIGS. 14a-14f are schematics of the analog signal aquisition components of the printhead controller circuit.
Figure 14B:
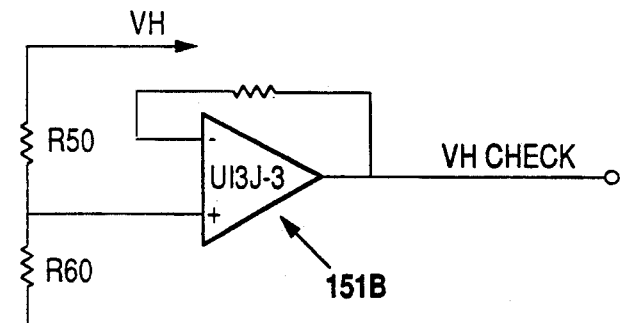
Figure 14C:
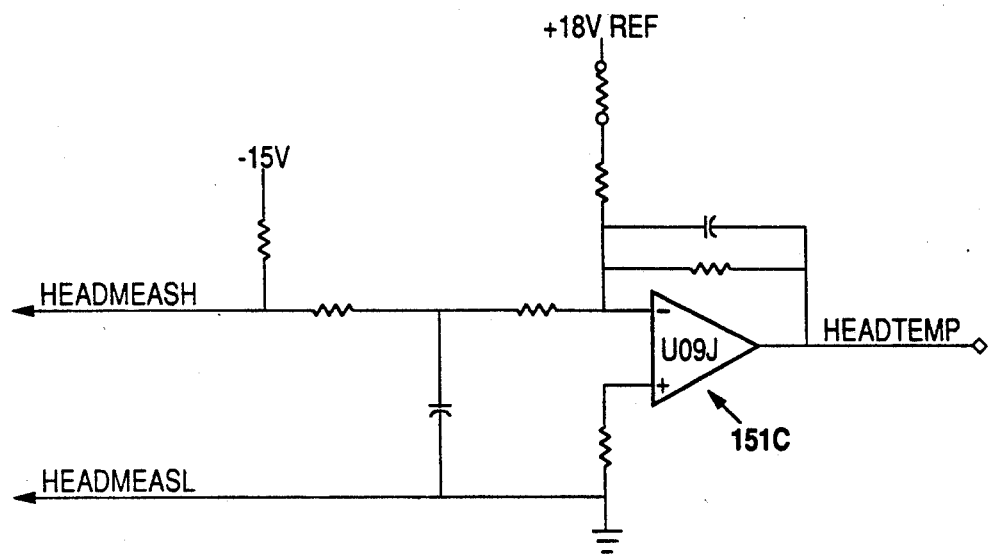
Figure 14D:
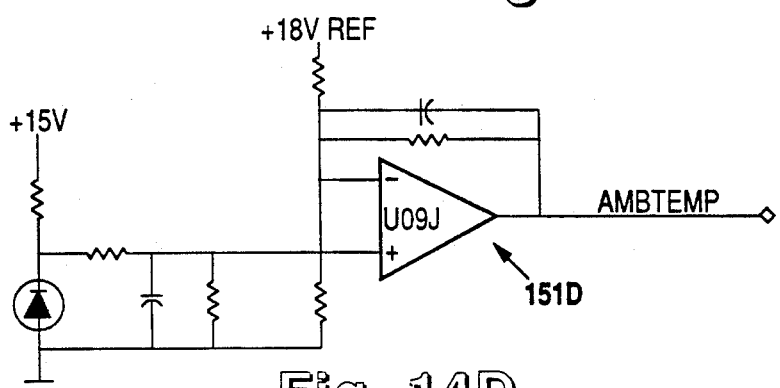
Figure 14E:
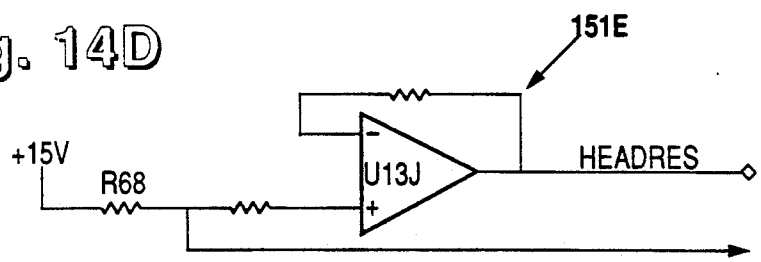
Figure 14F:
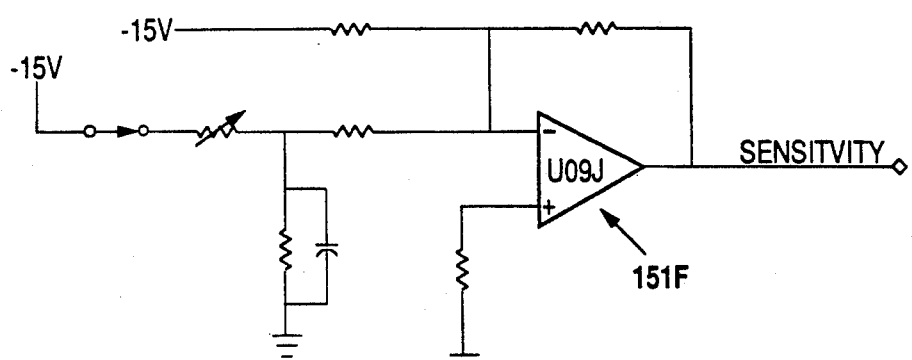

Part of the printhead controller circuitry 15 is shown in FIG. 13. The principal component is the 8751 microprocessor U16E. It generates the MEMOUTENx*, PREHEATEN* LATCH* DNEN (causing data to be transferred from the video memories 14 to the printhead), and the STROBEx* signals (causing the printhead to print the data).

The STROBEx* widths are a function of the paper/film sensitivity and gamma, printhead temperature, ambient temperature, printhead element resistance, and printhead supply voltage (VH). These variables are represented by analog DC signals which are converted to digital form by a multiplexer/A-D converter. The analog signal acquisition and conditioning circuits 151a-151f is shown in FIGS. 14a-14f. FIG. 15 shows the output circuitry which actually drives the printhead, and FIG. 16 shows the analog controller which controls the printhead heater.

A-D converter U15F is an 8-channel, 8-bit data acquisition system on a single IC chip. It consist of a multiplexer, successive approximation analog-to-digital converter, and an 8×8 dual-port RAM. In this application, it runs continuously, sequentially sampling, converting, and storing data from each input. Data is transferred to microprocessor or U16E when CS is asserted, from an internally defined address. The ALE (Address Latch Enable) signal from the microprocessor is used as the clock signal. A complete scan of all A-D channels requires 640 clock cycles. The frequency of the ALE signal is 1.333 MHz, so each analog input is sampled every 480 microseconds. The CS signal is applied to the "D" input of a flip-flop (U15C), which is clocked by the trailing edge of ALE. The resulting signal at U15C is an active low CS signal which changes synchronously with the trailing edge of ALE.

A-D converter U15F is configured to operate in the unipolar mode with an input signal range of 0 to +10.00 V. The scale factor is 0.0391 V/bit. The analog inputs to the 7581 are as follows. HEADTEMP is inversely proportional to the temperature of the printhead substrate. AMBTEMP indicates the temperature of a sensor on the controller board. VHCHECK is proportional to the output voltage of the VH power supply. SENSITIVITY indicates the position of the 10-position paper/film sensitivity selector switch. GAMMA indicates the position of the 10-position paper/film gamma selector switch. HEADRES (HEAD REsistance) indicates the nominal resistance of the elements in the printhead.

The microprocessor U16E, when not actually involved in a printing operation, operates in all idle loop where it continuously acquires and updates the analog variables. VHCHECK and HEADTEMP are evaluated, and the fault signals VHFLT or TEMPFLT are asserted if they are not within limits. On each trip through the idle loop, the HEADTEMP, SENSITIVITY, and GAMMA data are used to access lookup tables for the strobe widths to be used when the next image line is printed. A timer in the microprocessor U16E is used to measure the time between the printing of successive lines. If the time exceeds 2.5 milliseconds, a TIMEOUT bit internal to the microprocessor is set. The status of this bit determines whether printhead elements used on both the previous and current line are to be activated with prestrobe and mainstrobe STROBE* pulses, or only mainstrobe STROBE* pulses when printing in the graphics mode. The process of printing the data stored in the video memories 14 begins when the PRINTINT* (PRINT INTerrupt) signal is received from the memory controller 13. This indicates that the data in the video memories is ready to be printed. In response, the microprocessor U16E asserts MEMBUSY* (MEMOry BUSY) and PRINT-BUSY*. This informs the memory controller that the interrupt has been received and that the video memories are busy with a printing operation. If the TIMEOUT bit has not been set, PREHEATEN* is asserted.

In graphics mode, where neither NDOT12* nor NDOT34 is asserted and PREHEATEN* is not asserted, bit 1 data from the first two memories of memories 14 are transferred and printed, and then bit 1 data from the second two of memories 14 are transferred and printed. Data is shifted to the printhead 53 while LDNEN and MEMOUTENx* are asserted, and data is printed when the STROBEx*'s are asserted. If PREHEATEN* is asserted, bit 0 data is transferred beforehand to generate the prestrobe pulses. If NDOT12* and NDOT34 are asserted, the data from each of the four memory circuits of memories 14 are transferred and printed separately.

In all cases MEMBUSY* is cleared when the last data transfer is complete. This allows memory controller 13 to start moving data from line buffer 12 to video memories 14 while the last STROBEx* signal is still asserted. The completion of each data transfer operation is indicated by the MEMOUINT* (Memory Output Interrupt) signal. PRINTBUSY* is cleared when the last STROBE* signal is deasserted. This allows memory controller 13 to send PRINTINT* to printhead controller 15 as soon as video memories 14 contain data for a new image line.

In gray scale mode, PREHEATEN*, NDOT12*, and NDOT34* have no role. Printhead controller 15 handles the data for each image line the same way, regardless of data content. All four MEMOUTENx* signals are asserted simultaneously, so that data in all four sections of the printhead 50 are printed at the same time.

Figure 15A:
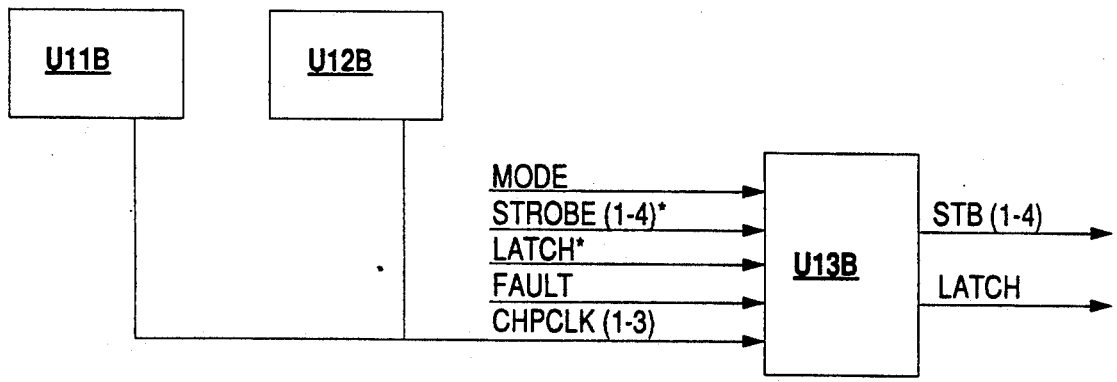
FIGS. 15a and 15b are schematics of the printhead driver components of the printhead controller circuit.
Figure 15B:
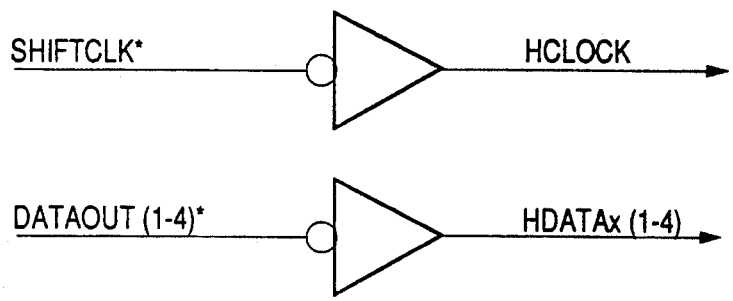
Figure 16:
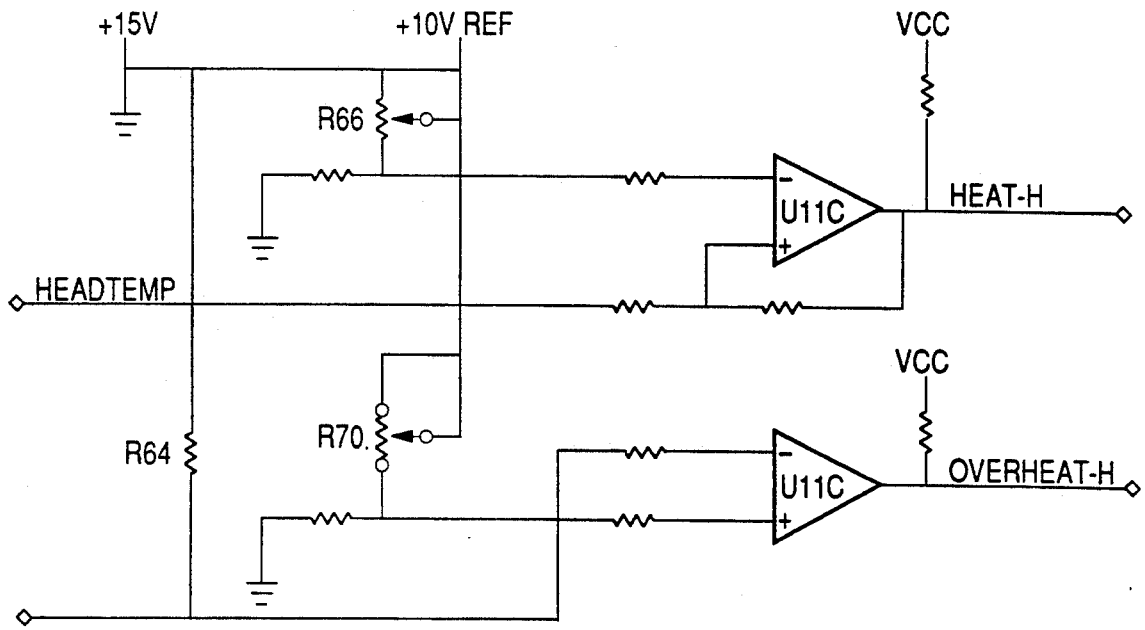
FIG. 16 is a schematic of the printhead heater control components of the printhead controller circuit.

The printhead driver circuit is shown in FIGS. 15a and b. As shown schematically in FIG. 15b, the SHIFTCLK and the four DATAOUTx signals are simply inverted and sent to the printhead 53 via open-collector drivers. The data on the HDATAx lines is shifted into the printhead shift registers by the rising edge of the HCLOCK signal. In graphics mode, the STROBEx and LATCH signals (FIG. 15a) go through PAL U13B and open-collector, non-inverting drivers (not shown). In this mode, the STROBEx's are inhibited by the FAULT signal, but are otherwise unmodified. In gray scale mode, the STROBEx signals are also inhibited by the FAULT signal, and are "chopped" so that each is sequentially low for 16 out of every 64 microseconds. The U11B and U12B counters provide 62.5 kHz, 31.25 kHz, and 15.625 kHz signals to PAL U13B for use in chopping the strobe signals. The counters are cleared when none of the STROBEx signals are asserted. This assures that the counters start in the same state at the beginning of each STROBEx signal. As in the graphics mode, MEMBUSY (FIG. 3) is cleared at the end of the last data transfer to the printhead. However, PRINTBUSY (FIG. 3) is not cleared immediately after the last STROBE signal. It is kept asserted for some time to allow the printhead elements to cool so that the retained heat has a negligible effect on the density of the next image line.

As noted above, FIGS. 14a-f are diagrams of the analog circuitry 135 used to acquire and scale the HEADTEMP, AMBTEMP, HEADRES, VHCHECK, SENSITIVITY, and GAMMA signals. The source of the HEADTEMP (FIG. 14c) signal is a thermistor (HEADMESH) in the printhead. The ambient temperature sensor is mounted on the controller board. VHCHECK (FIG. 14b) is simply VH/2, and is obtained by the R50/R60 voltage divider and U13J-3 voltage follower. HEADRES (head resistance - FIG. 14) is derived from a voltage divider formed by R68 and a programming resistor in the printhead. The voltage divider output is buffered by voltage follower U13J-4. The value of the programming resistor indicates the resistance of the elements in the printhead. The circuits providing the SENSITIVITY and GAMMA signals (FIGS. 14a and 14f) are identical, and consist of switched voltage dividers and scaling amplifiers.

Power is supplied to the printhead heater by a solid-state relay which is controlled by the circuit shown in FIG. 16. To apply power to the heater, HEAT-H must be high, and OVERHEAT-H must be low. HEAT-H is developed by comparing the HEADTEMP signal with an adjustable reference voltage. The printhead is normally operated at a temperature of 65° C. (149° F.). At this temperature, HEADTEMP=5.38 V and varies inversely with temperature. To operate the printhead at this temperature, the reference voltage is set to 5.38 V by means of R66. When the printhead is cold, HEADTEMP is more than 5.38 V, and HEAT-H is high. When the temperature is more than 65° C. (149°), HEADTEMP is less than 5.38 V, and HEAT-H is low. To prevent damage due to a defective thermistor, or to respond to a failure anywhere in the HEADTEMP circuit, a safety circuit is used to turn off the relay if the printhead temperature exceeds a preset limit. The source of the over-temperature signal is a positive temperature coefficient resistive sensor mounted on the printhead mounting block. This sensor is connected as the bottom leg of a voltage divider with R64, between the +10 VREF voltage and ground. The signal from the sensor will normally be less than the reference voltage set by R70, and OVERHEAT-H will be low. If the sensor signal level exceeds the reference level, OVERHEAD-H goes high, and the relay is turned off.

What is claimed is:

1. A system for imaging lines of pixels on thermally sensitive paper in accordance with stored digital data, comprising:
    a printhead comprising printhead segments each having a plurality of resistor elements corresponding to each pixel in a line and further comprising a segmented printhead shift register and corresponding segmented data latches;
    a line buffer for accepting digital data in parallel form and transmitting the data in serial form;
    a memory for accepting the transmitted serial data;
    a memory controller for storing the transmitted data in the memory and sequentially outputting the data serially to each of the shift register segments in a graphics mode or simultaneously to each shift register segment in a gray scale mode;
    a printhead controller for producing latch pulses for latching the outputs of the shift register segments into the corresponding data latch segments and further for producing separate strobe pulses for driving each printhead segment; and
    means for printing pixels in either the graphics mode wherein each bit of the digital data signifies whether a pixel is to be printed or not or in the gray scale mode wherein separate words of the digital data for each pixel represent the desired optical density for that printed pixel.

2. The system of claim 1 wherein the printhead controller further comprises means for measuring the resistance of the resistor elements and adjusting the width of the strobe pulses in accordance therewith to maintain uniform optical density of the printed pixels.

3. The system of claim 1 wherein the printhead controller further comprises means for measuring ambient temperature and adjusting the width of the strobe pulses in accordance therewith to maintain uniform optical density of the printed pixels.

4. The system of claim 1 wherein the printhead controller further comprises means for measuring printhead temperature and adjusting the width of the strobe pulses in accordance therewith to maintain uniform optical density of the printed pixels.

5. The system of claim 1 wherein the printhead controller further comprises means for adjusting the width of the strobe pulses in accordance with the length of time between print operations.

6. The system of claim 1 wherein the separate strobe pulses produced by the printhead controller cause current to be driven through the resistor elements in accordance with the state of the segmented data latches.

7. The system of claim 1 wherein the printhead further comprises a resistance heater strip bonded to a printhead substrate or a printhead mount to permit printhead preheating.

8. The system of claim 1 wherein the separate strobe pulses produced by the printhead controller in the gray scale mode are pulsed with sequential 25% duty cycles for each print cycle to allow printing of all printhead segments during that print cycle.

9. The system of claim 8 wherein the strobe pulses are asserted until all data shifts and printhead segment prints have occurred and the printed pixel is the desired optical density.

10. A system for imaging lines of pixels on thermally sensitive paper in accordance with stored digital data, comprising:
   a printhead comprising a plurality of resistor elements corresponding to each pixel in a line which are heated by strobe pulses in accordance with the state of printhead data latches and further comprising a printhead shift register, the contents of which may be latched into the data latches;
   a line buffer for accepting digital data in parallel form and transmitting the data in serial form;
   a memory for accepting the transmitted serial data;
   a memory controller for storing the transmitted serial data in the memory and sequentially outputting the contents of the memory to the shift register of the printhead;
   a printhead controller for producing latch pulses for latching the outputs of the shift register into the data latches and further for producing strobe pulses causing current to be driven through the resistor elements in accordance with the state of the data latches; and,
   means for skewing the data on the thermal paper in order to equalize element usage.

11. The system of claim 10 wherein the skewing is implemented by printing the first pixel of each line of data on a page with one printhead resistor element and periodically shifting the first pixel between different printhead resistor elements on subsequent lines.

12. An apparatus for printing lines of pixels representing stored digital data on thermally sensitive paper such that each printed pixel varies in optical density according to a plurality of shades dictated by stored digital data, comprising:
   means for storing element words of digital data with each element word dictating the optical density for a particular printed pixel in a line;
   a printhead having a plurality of resistor elements corresponding to each pixel in a line;
   means for generating a current pulse through the resistor element corresponding to each element word for a number of cycles dictated by the value of the element word, wherein the resistor elements are driven in accordance with the contents of a shift register, the shift register being divided into a plurality of segments which can be loaded simultaneously with bits corresponding to the stored element words; and,
   means for sequentially outputting the current pulses to the resistor elements corresponding to each segment of the shift register such that only one segment of the resistor elements is activated at any one time.

13. The apparatus of claim 12 further comprising:
   means for decrementing each element word by one after each current pulse until the word contains all zeroes;
   means for generating current pulses through only those resistor elements which correspond to element words having nonzero values; and,
   means for generating a number of pulse-decrement cycles equal to the number of possible shades representable by the element words.

14. The apparatus of claim 12 further comprising:
   means for skewing the data on the paper in order to equalize element usage.

15. The apparatus of claim 14 wherein the skewing is implemented by printing the first pixel of each line of data on a page with one resistor element and periodically shifting the first pixel between different resistor elements on subsequent lines.

16. An apparatus for printing lines of pixels representing stored digital data on thermally sensitive paper in accordance with bits of stored digital data, comprising:
   a shift register for storing the bits of digital data with each bit corresponding to a particular printed pixel in a line, the shift register being divided into a plurality of segments which can be loaded simultaneously with bits corresponding to the stored digital data;
   a printhead having a plurality of resistor elements corresponding to each pixel in a line;
   means for activating each resistor element according to the value of the corresponding bit of stored digital data by generating a current pulse through the resistor element;
   means for sequentially outputting the current pulses to the resistor elements corresponding to each segment of the shift register such that only one segment of the resistor elements is activated at any one time; and,
   means for activating selected pairs of resistor element segments simultaneously when the total number of resistor elements to be activated in the selected pair is less than the total number of resistor elements in a segment.

17. The apparatus of claim 16 further comprising:
   means for skewing the data on the paper in order to equalize element usage.

18. The apparatus of claim 17 wherein the skewing is implemented by printing the first pixel of each line of data on a page with one resistor element and periodically shifting the first pixel between different resistor elements on subsequent lines.

* * * * *